A. B. MEINHARDT.
HARVESTER.
APPLICATION FILED DEC. 30, 1915.
1,223,999. Patented Apr. 24, 1917.
28 SHEETS—SHEET 17.
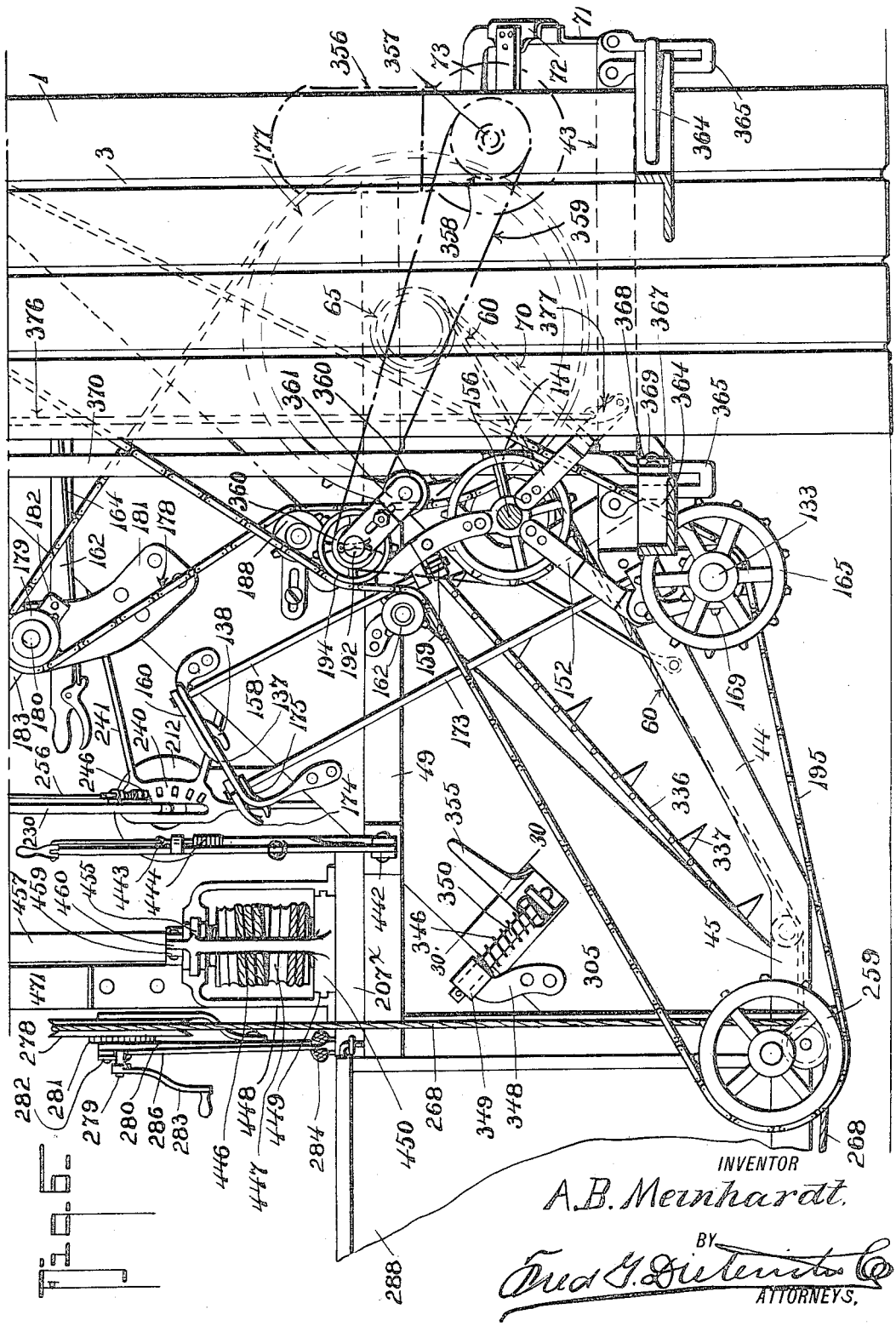
INVENTOR
A.B. Meinhardt.
BY
Fred G. Dieterich
ATTORNEYS.

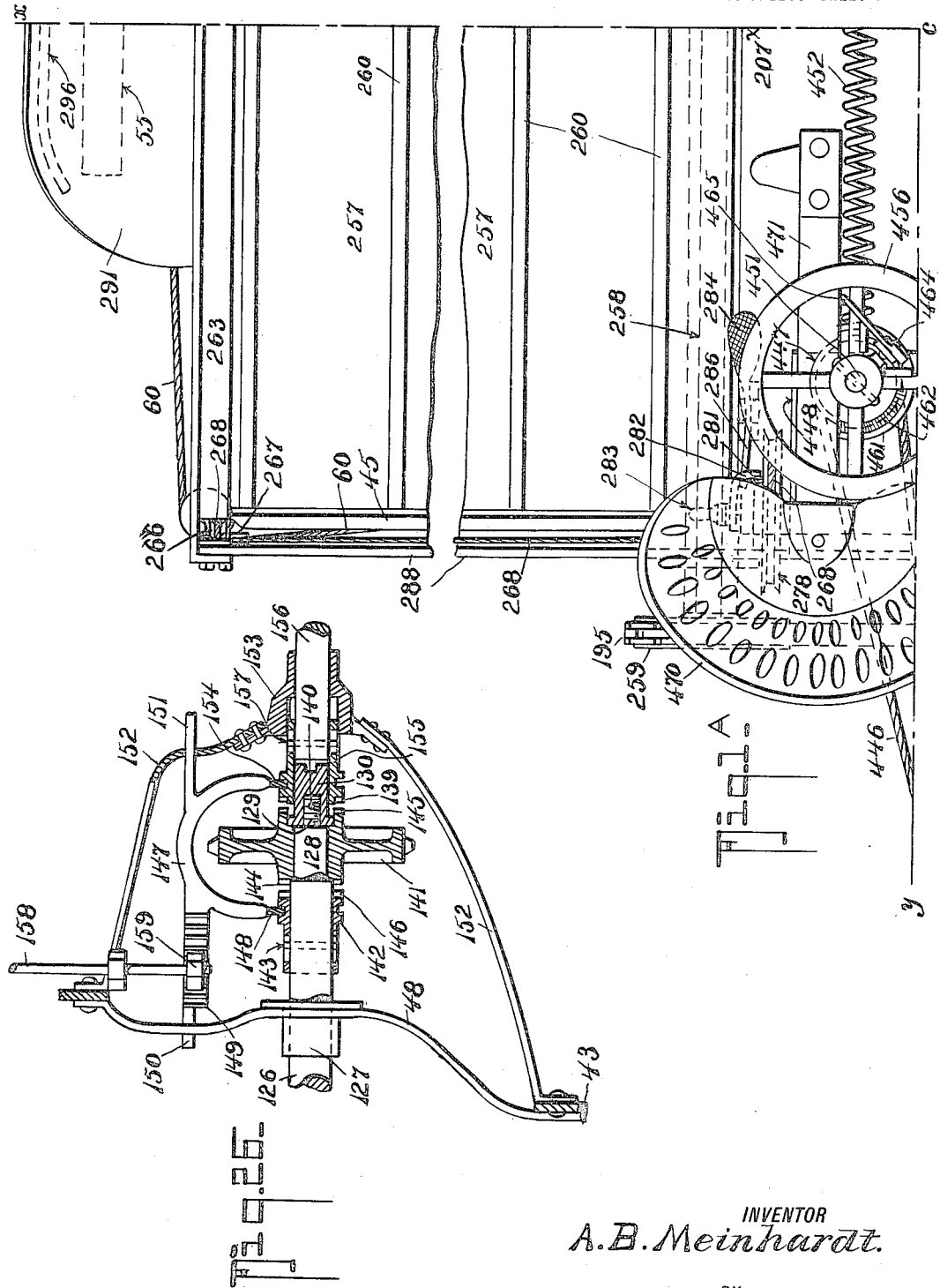

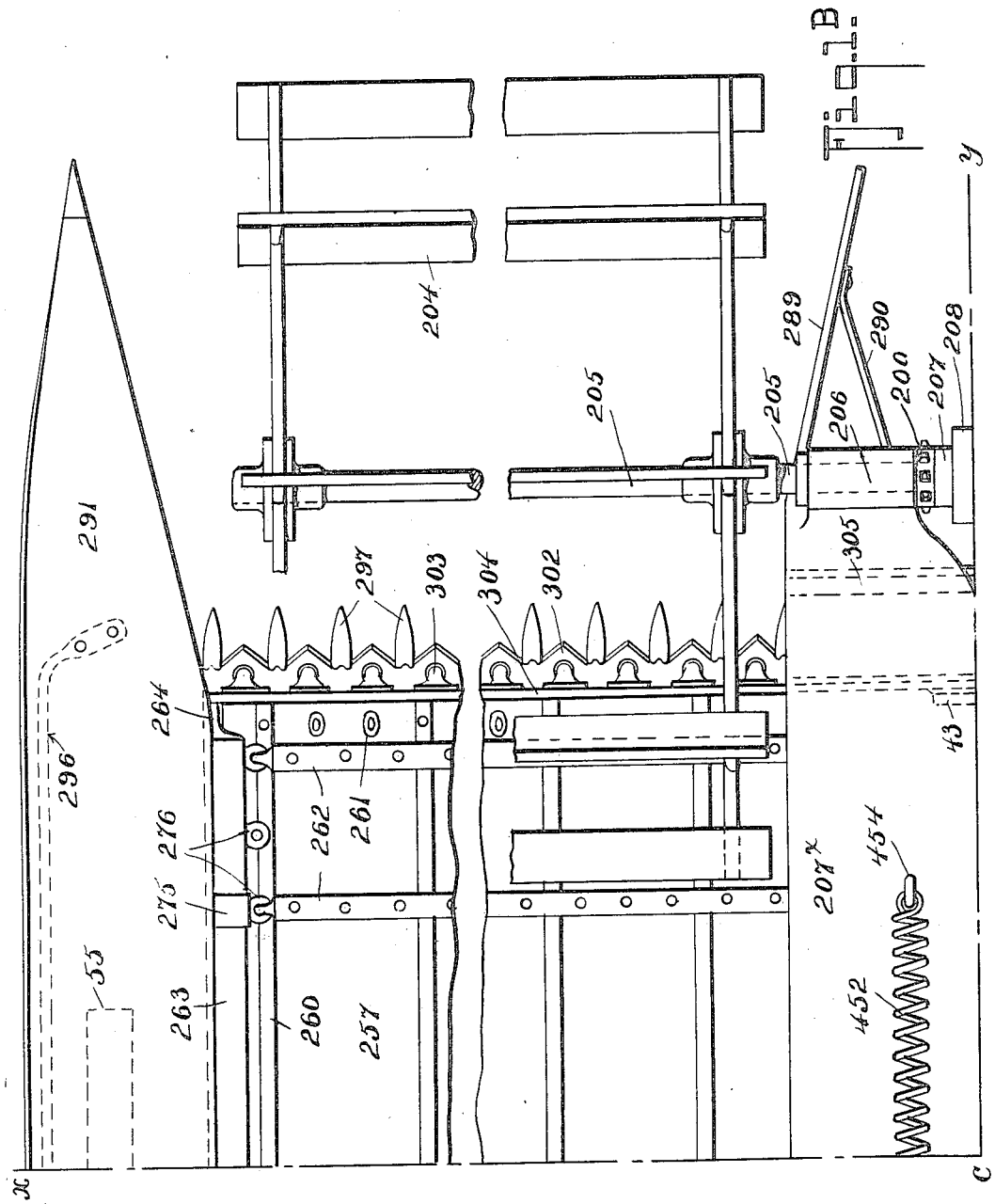

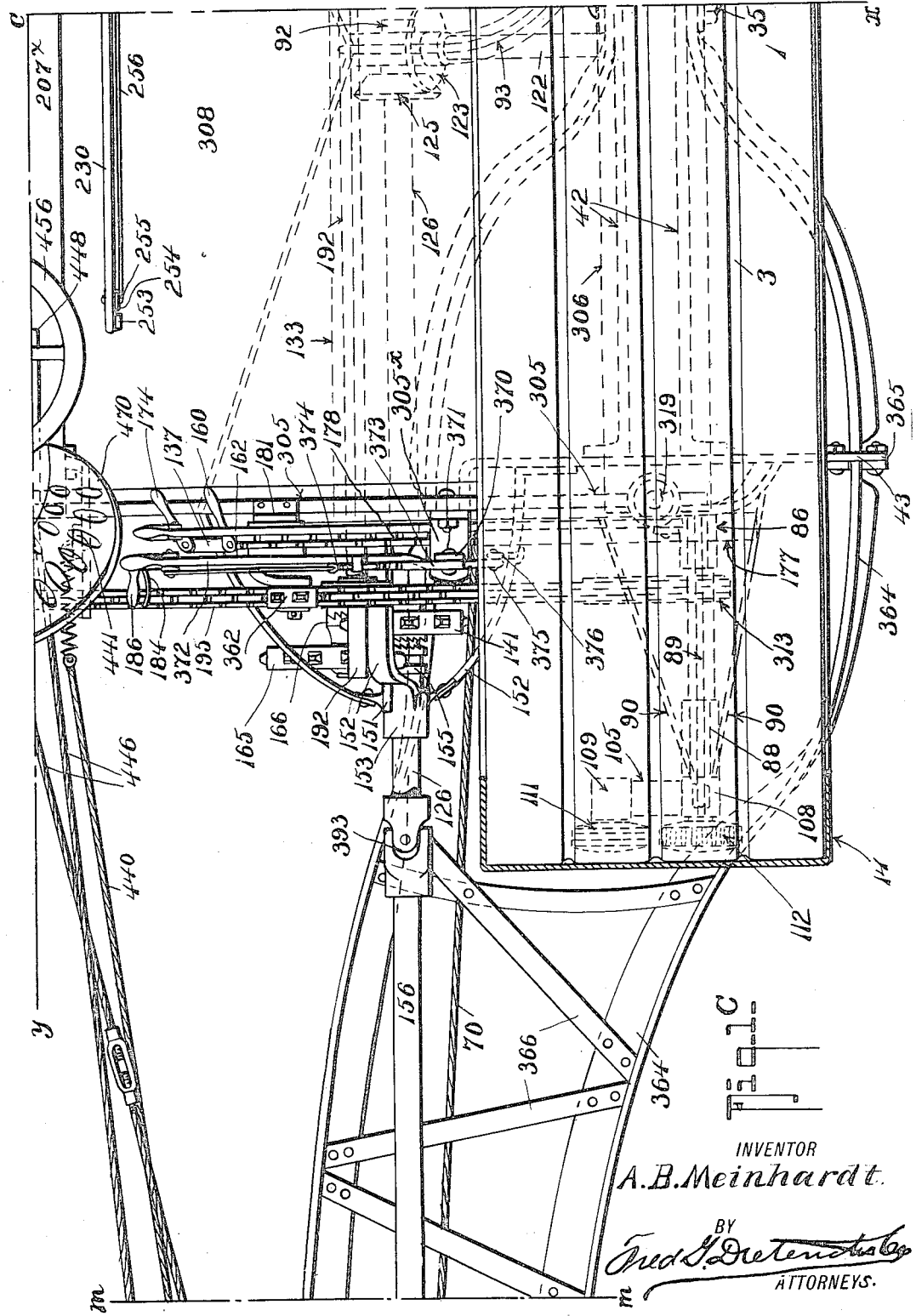

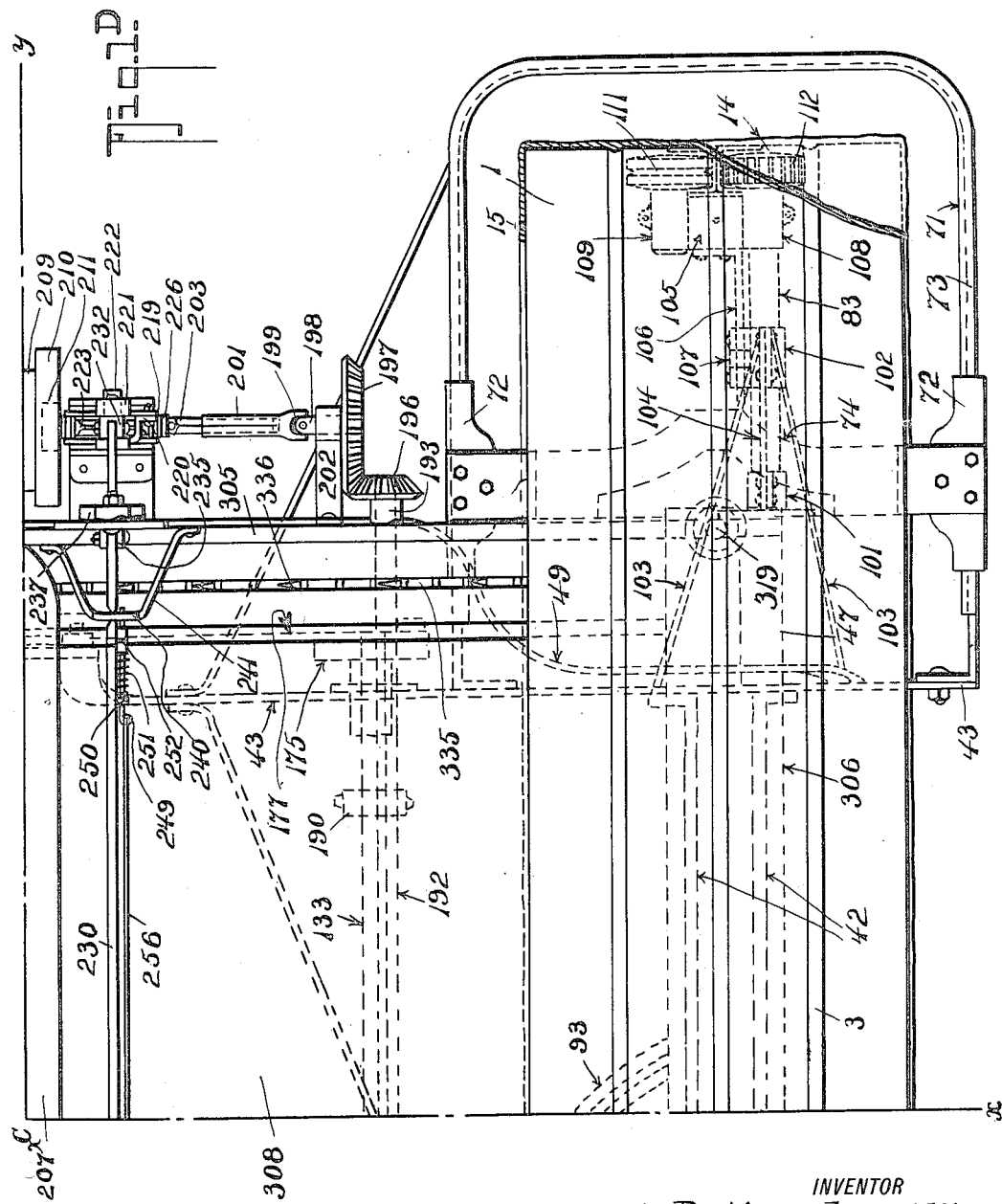

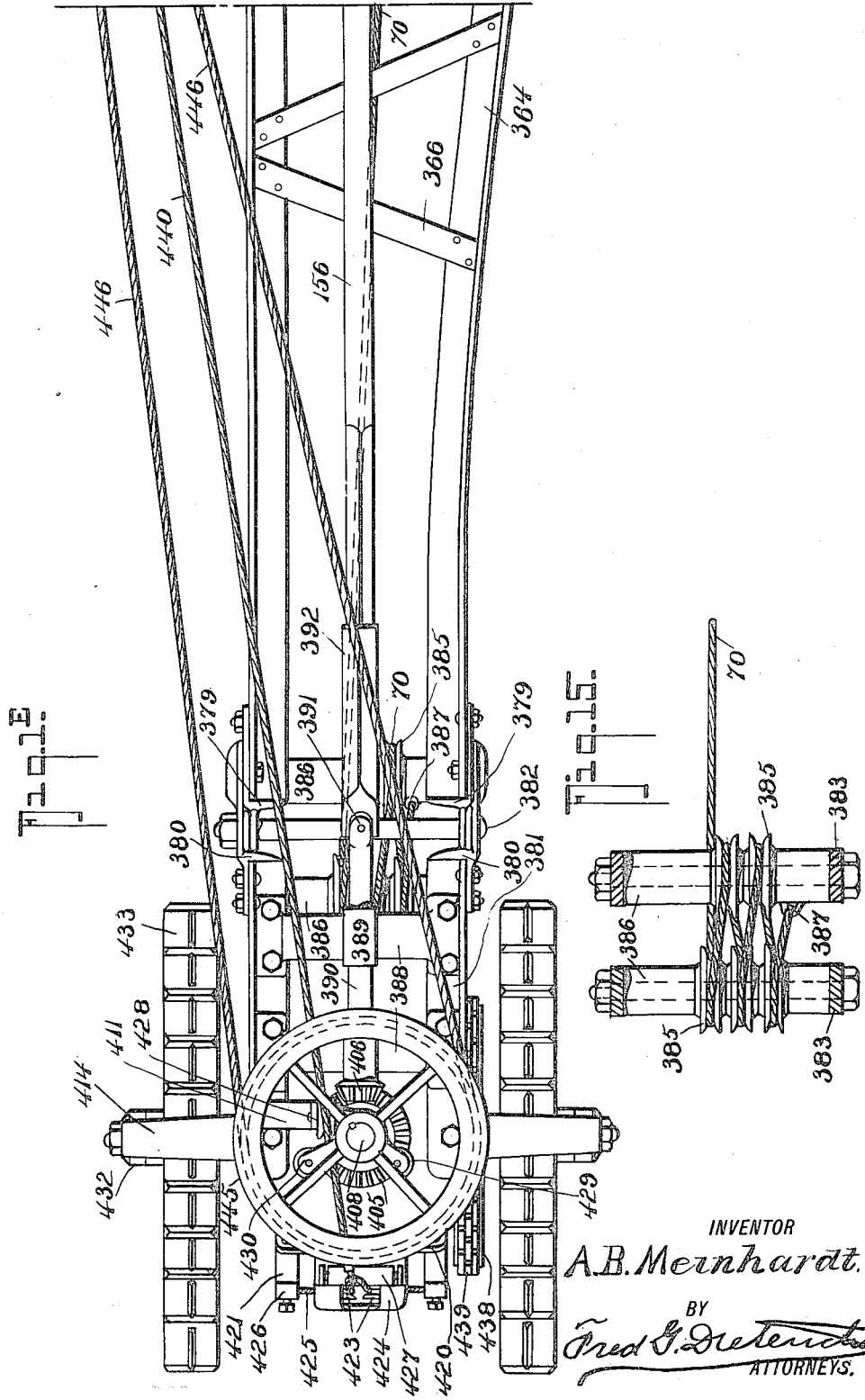

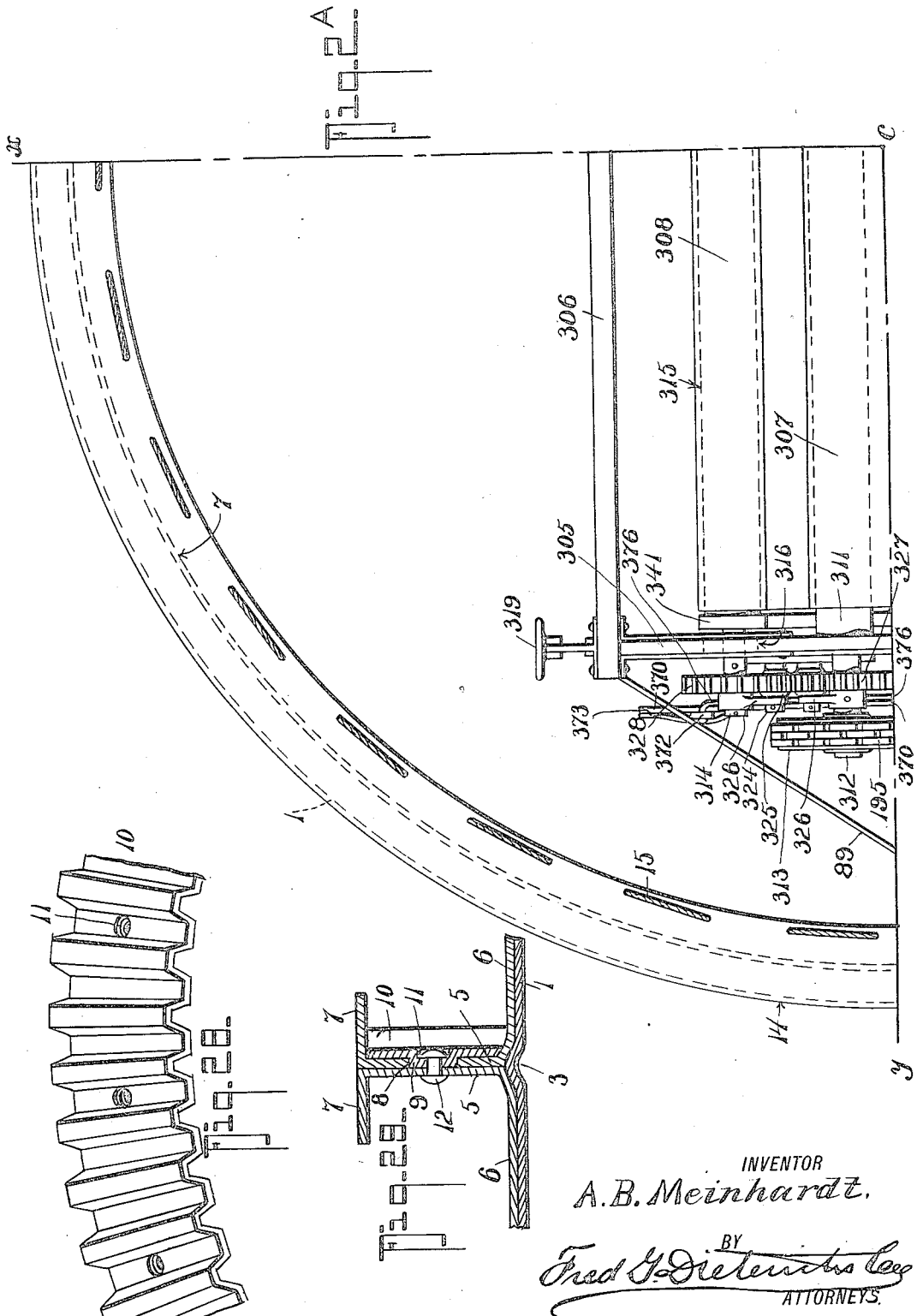

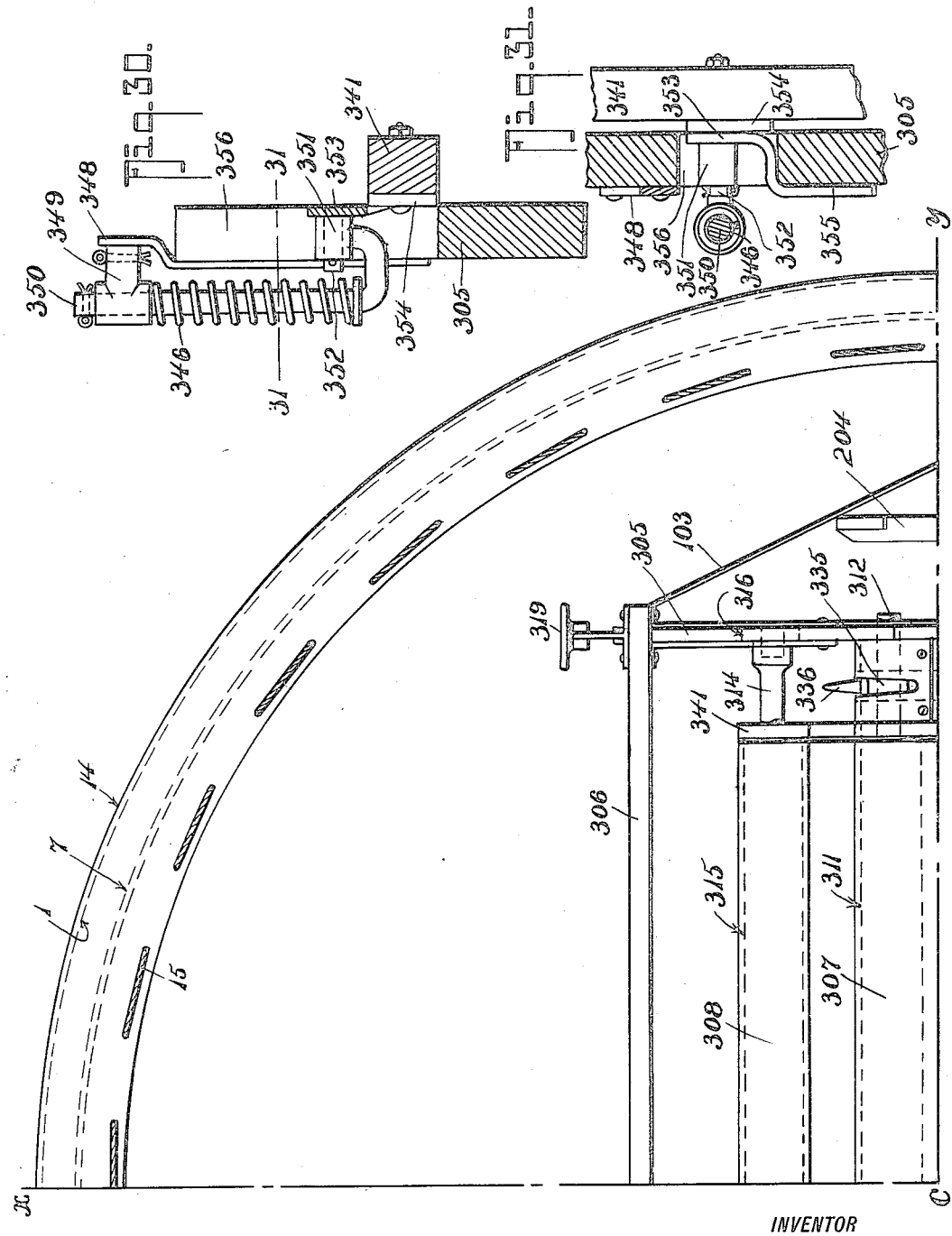

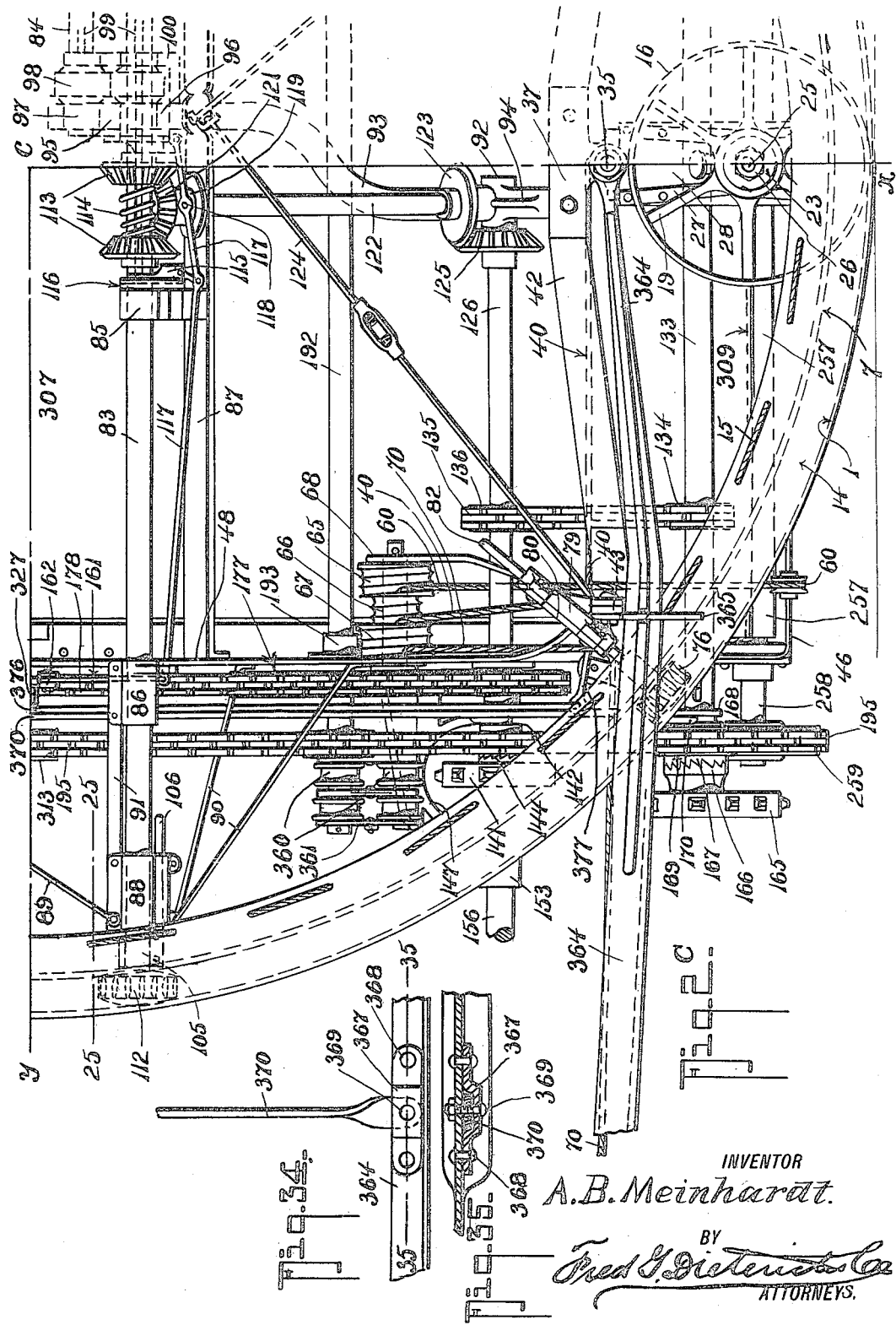

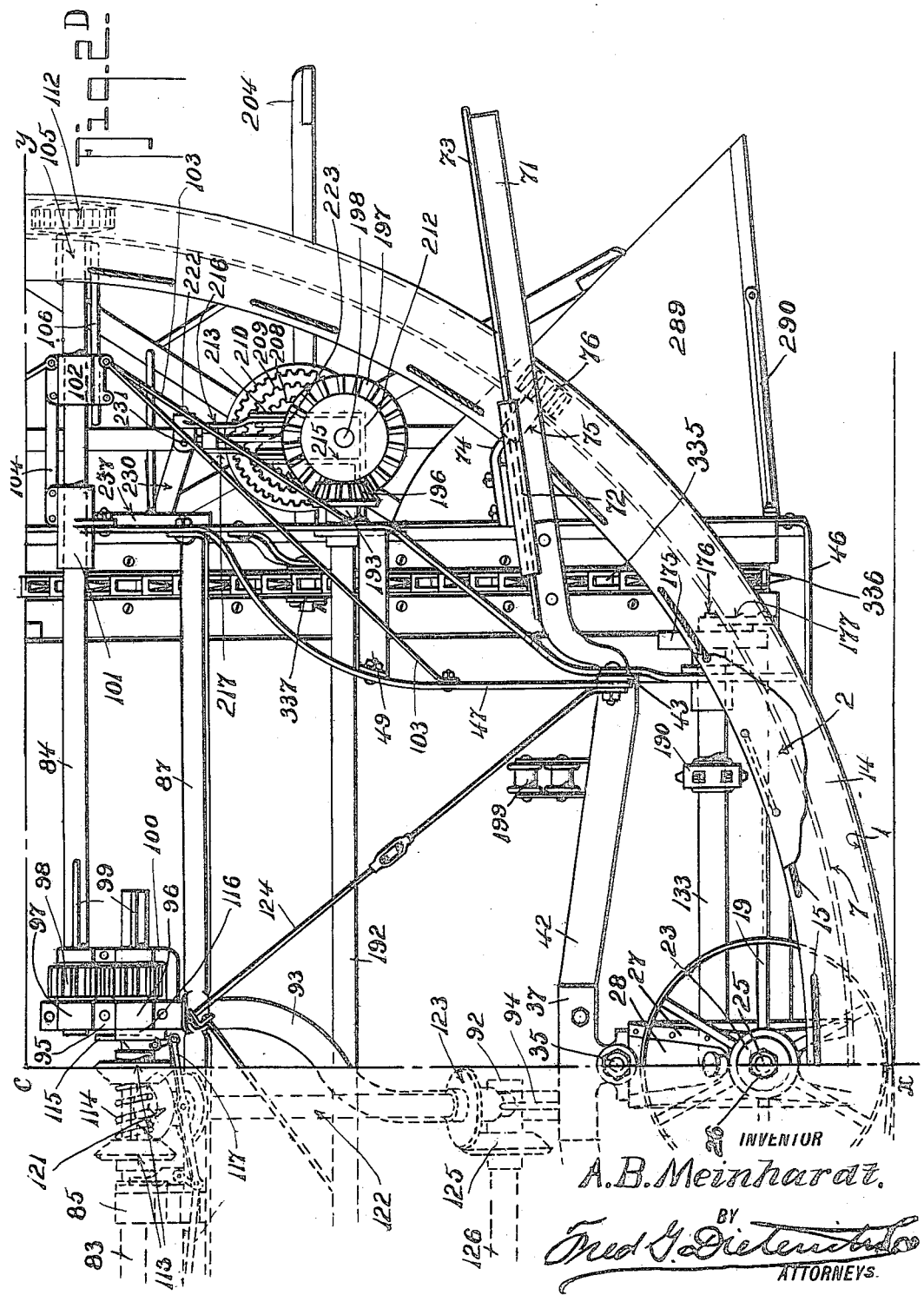

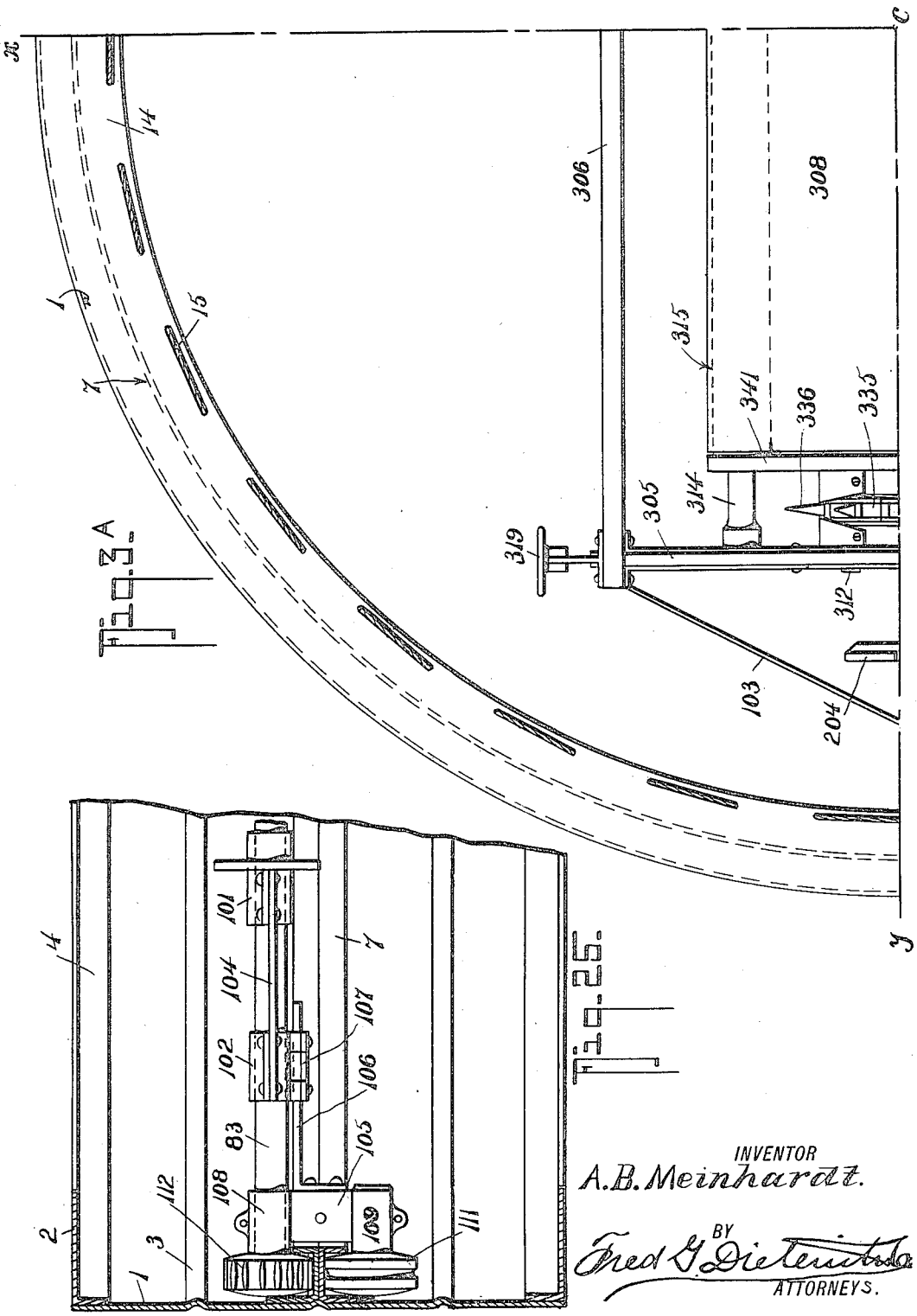

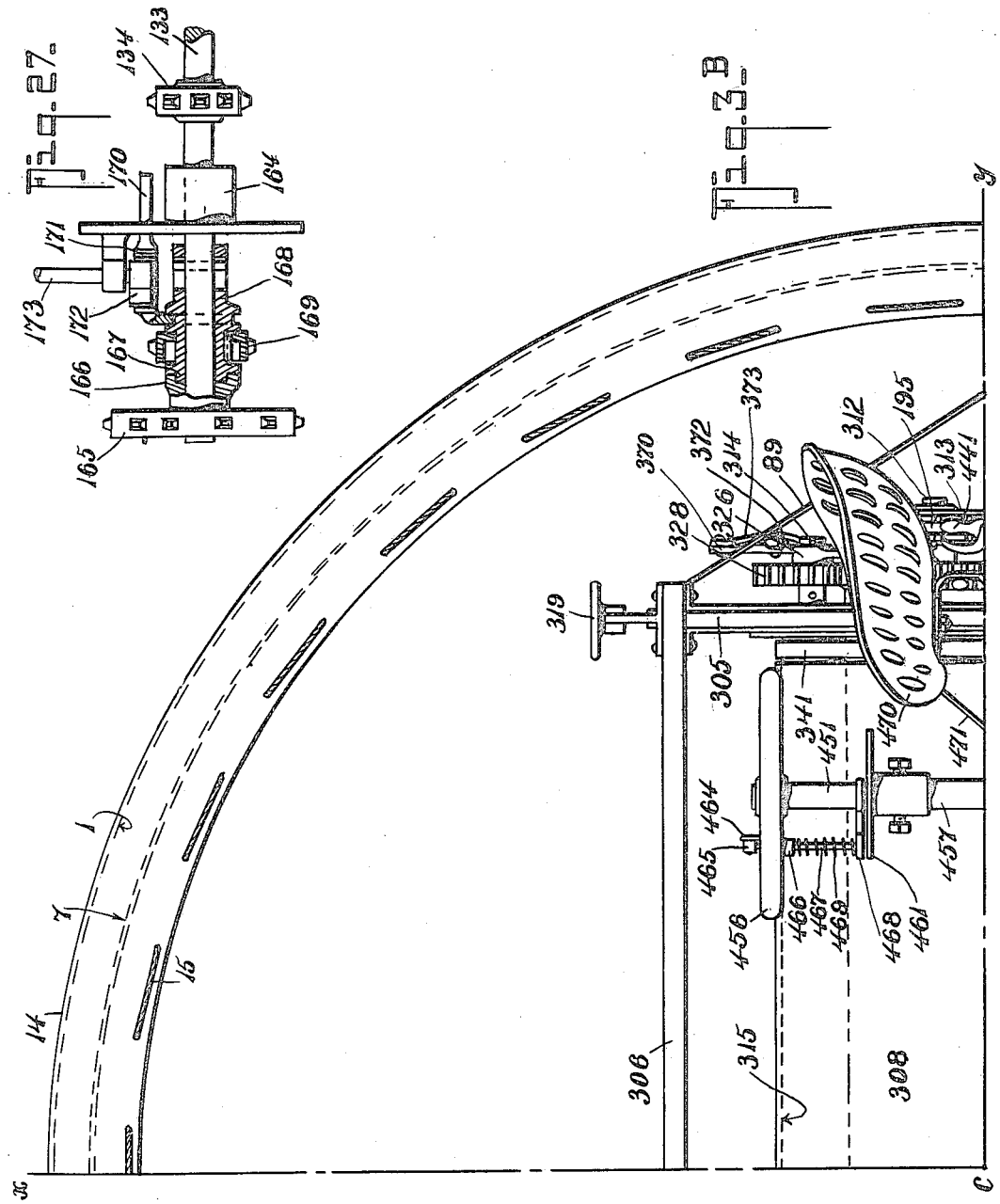

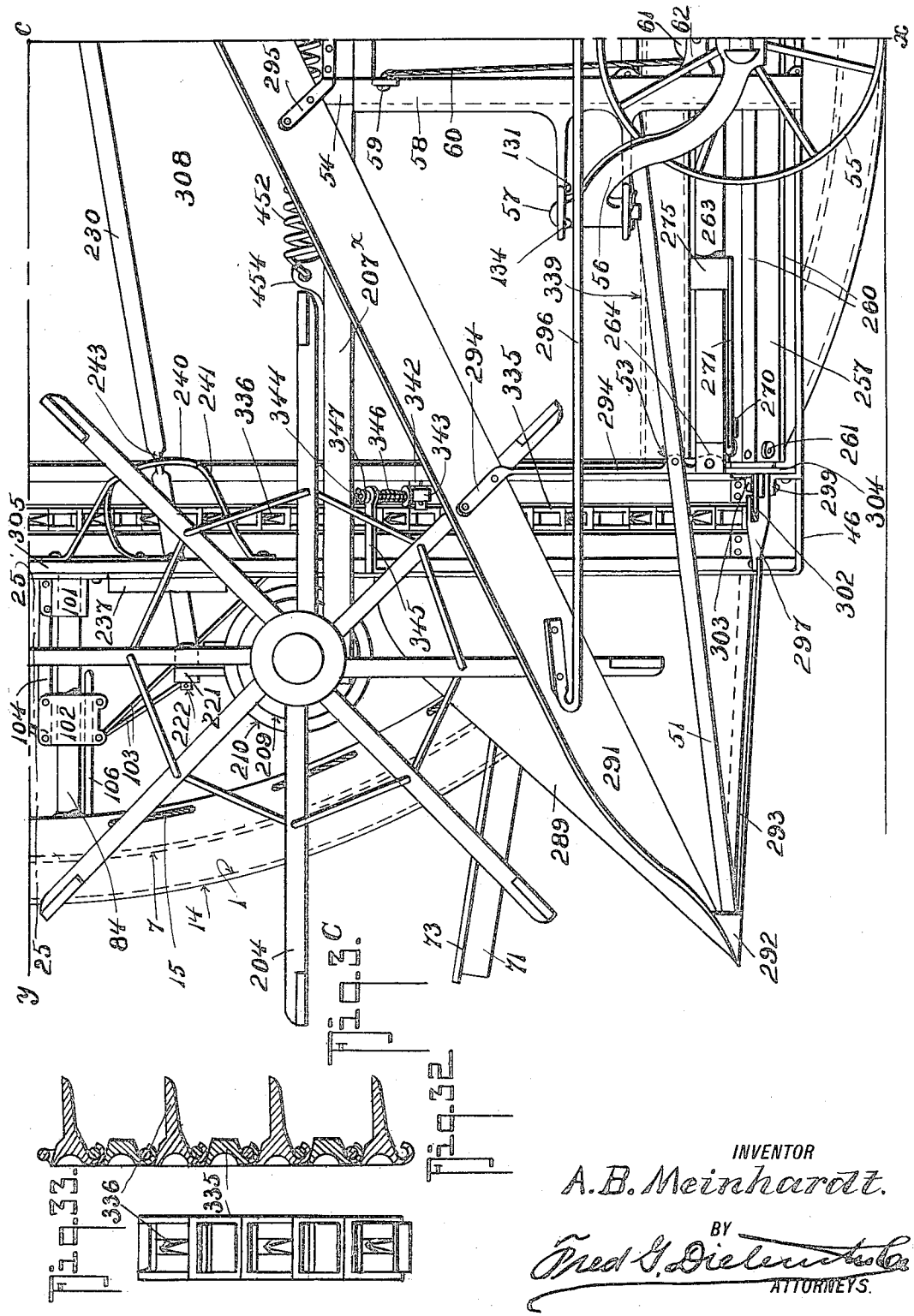

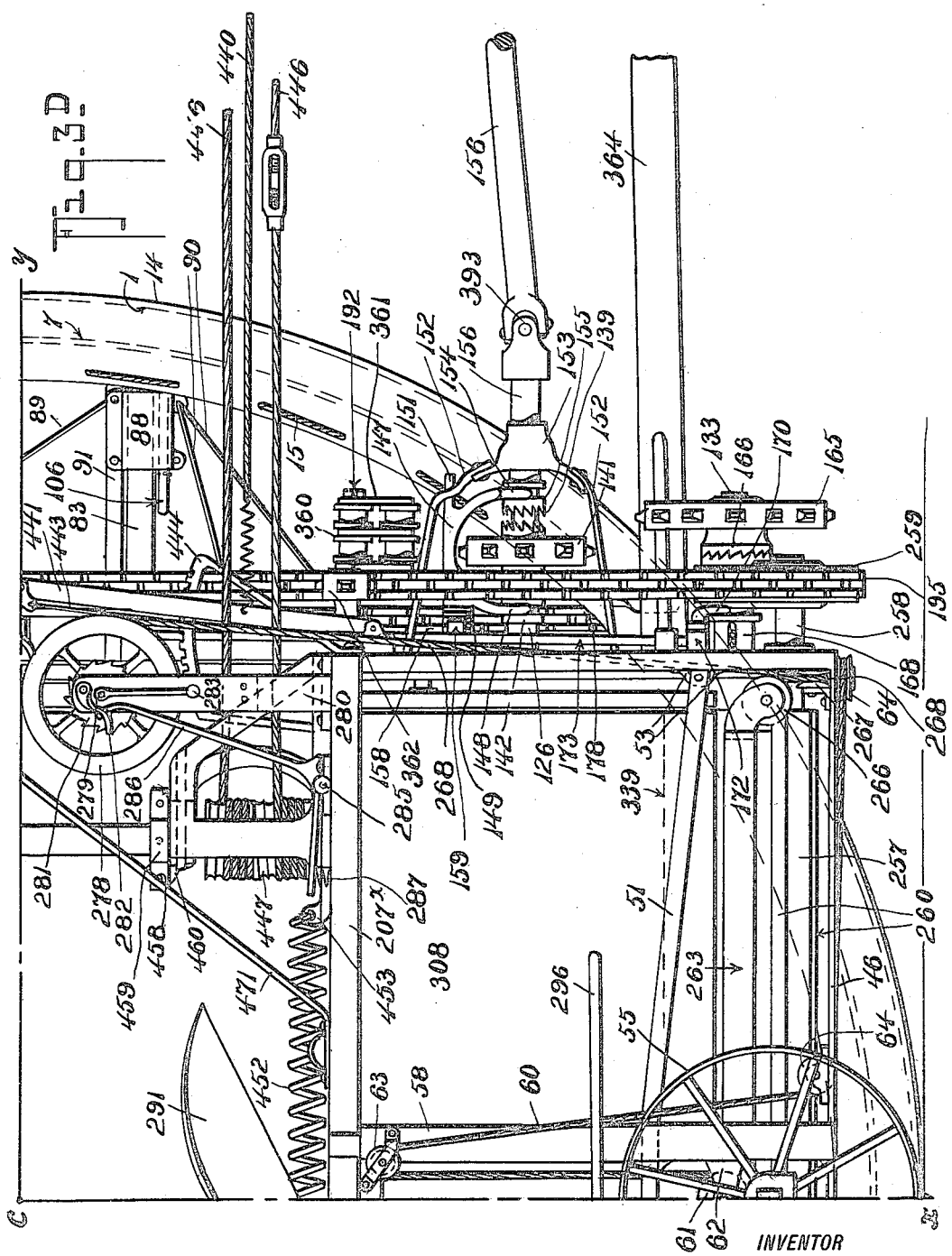

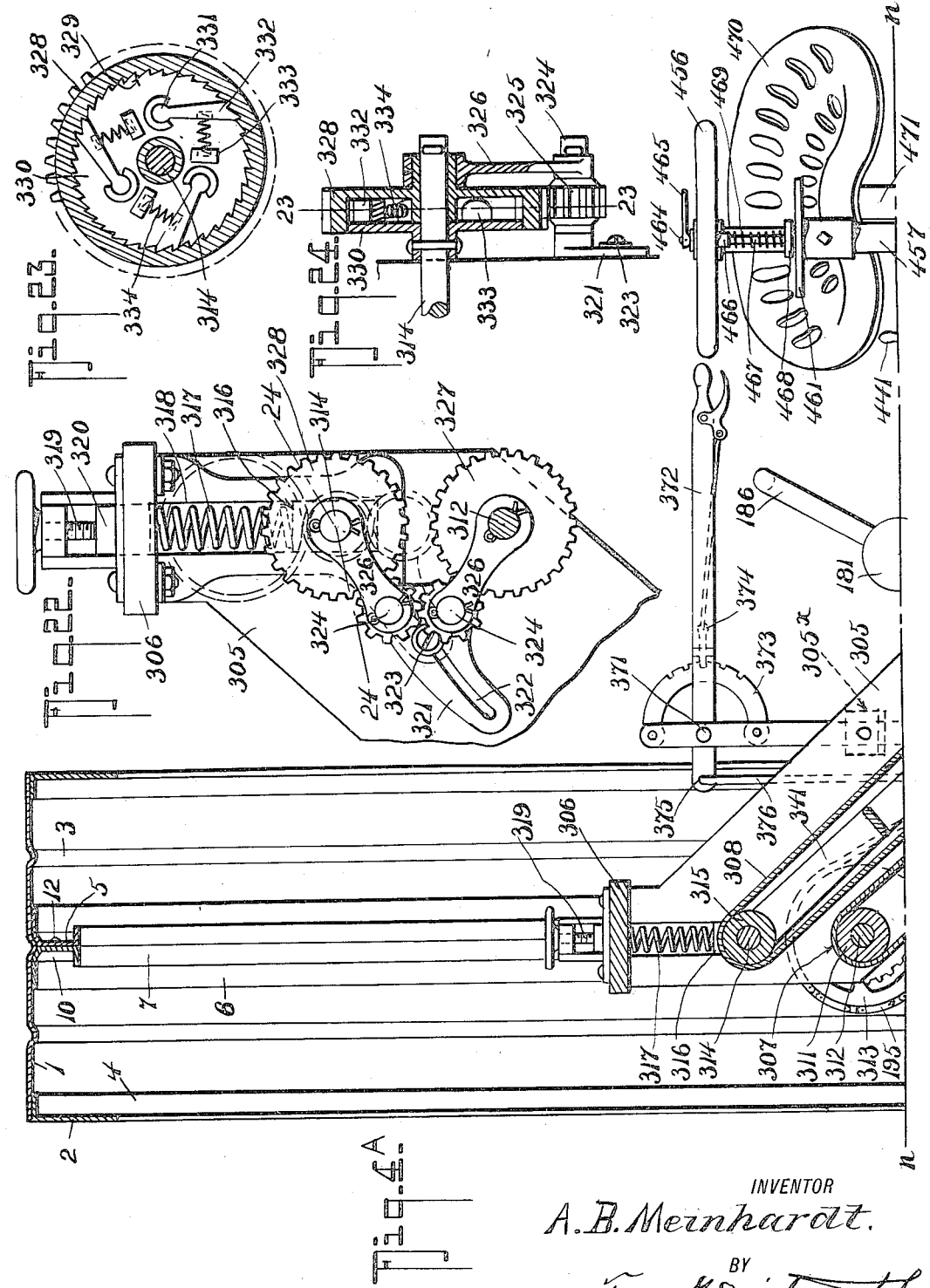

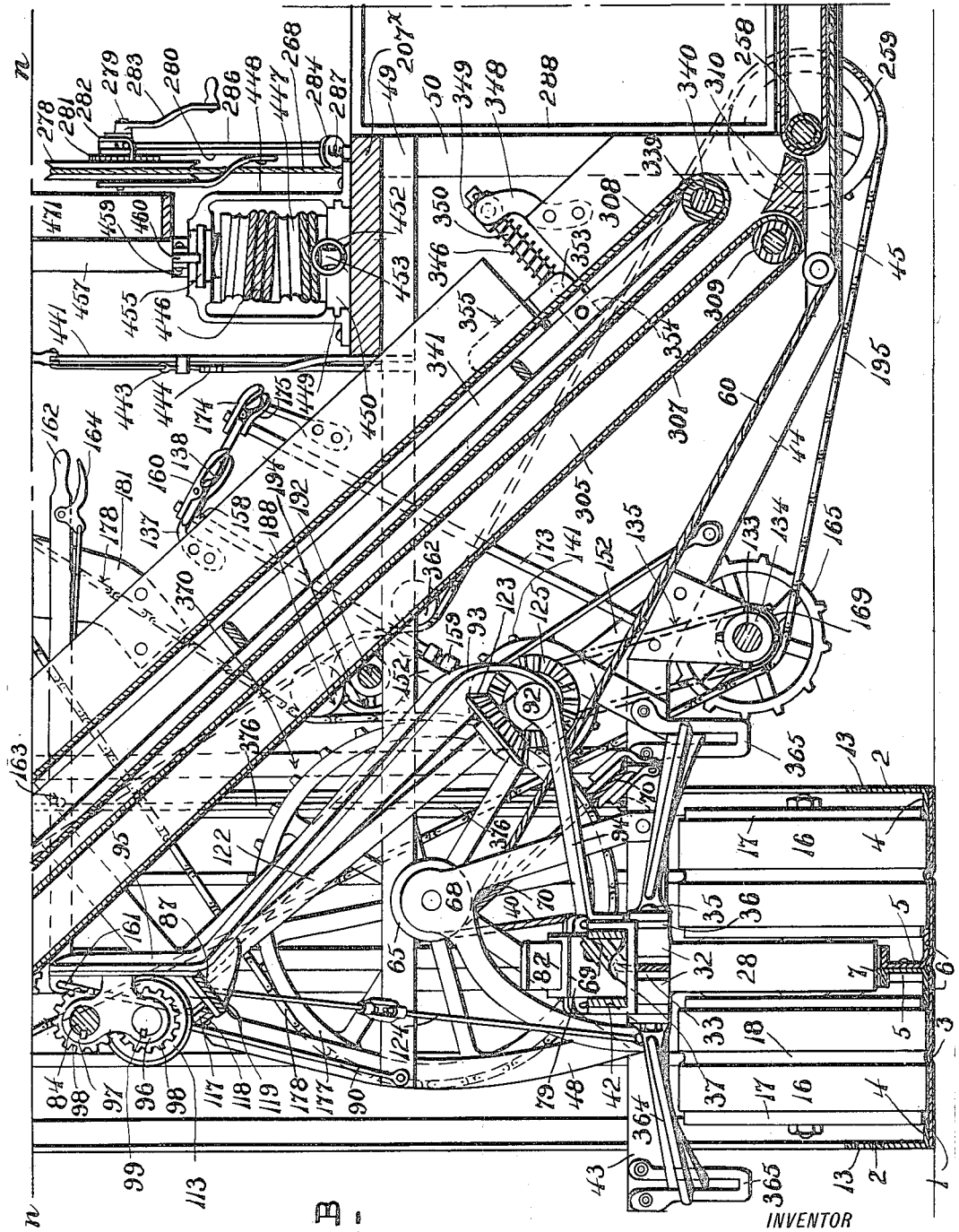

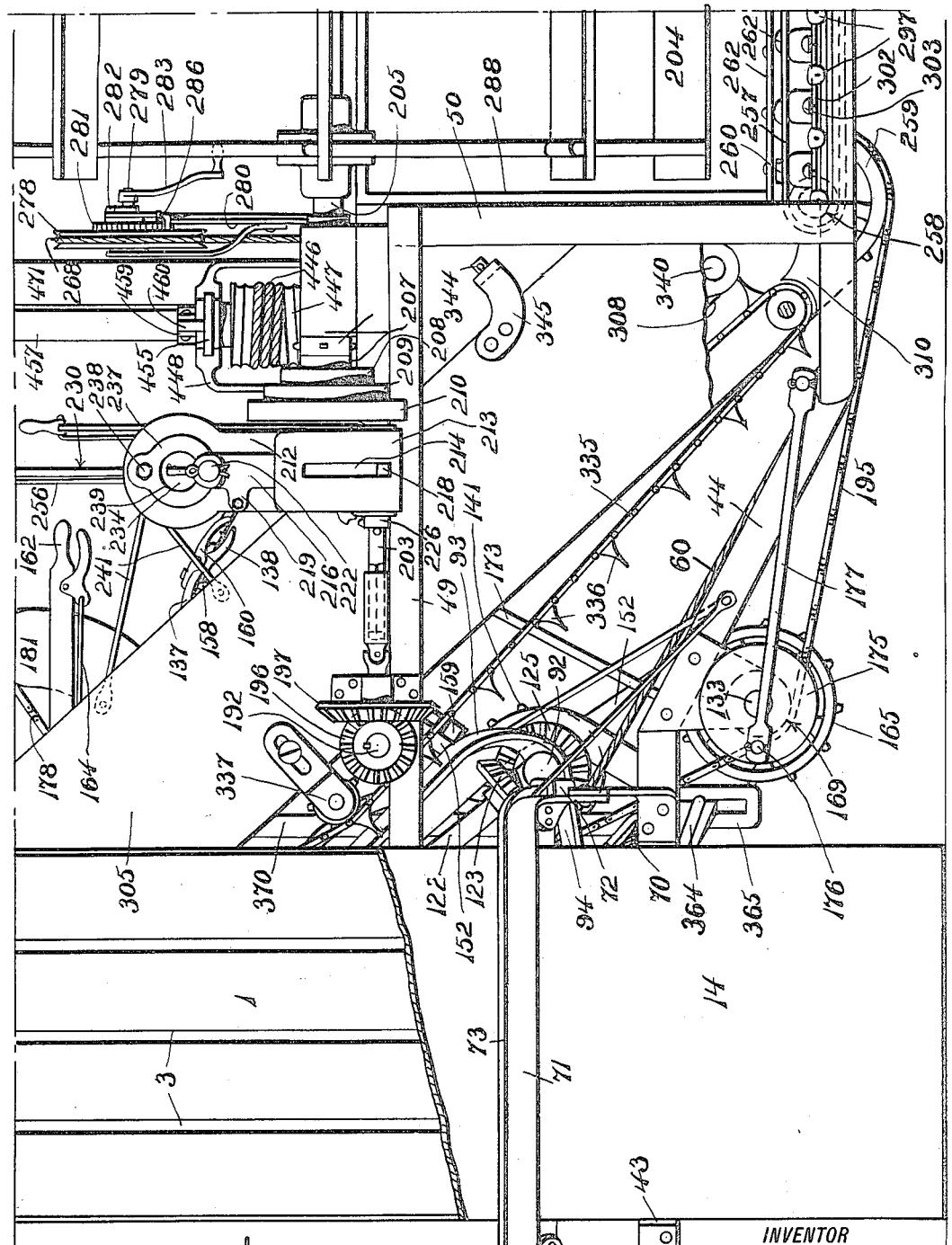

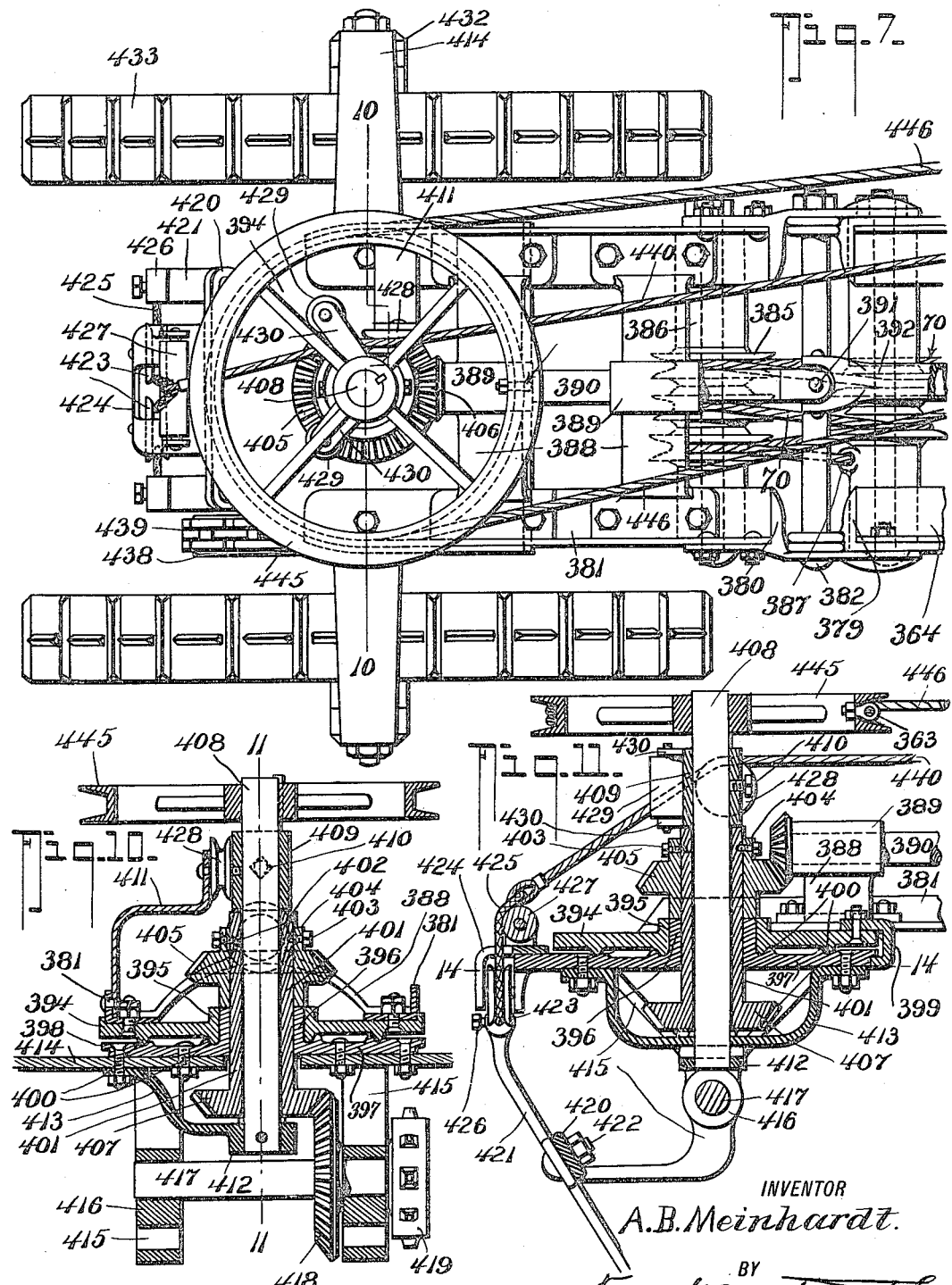

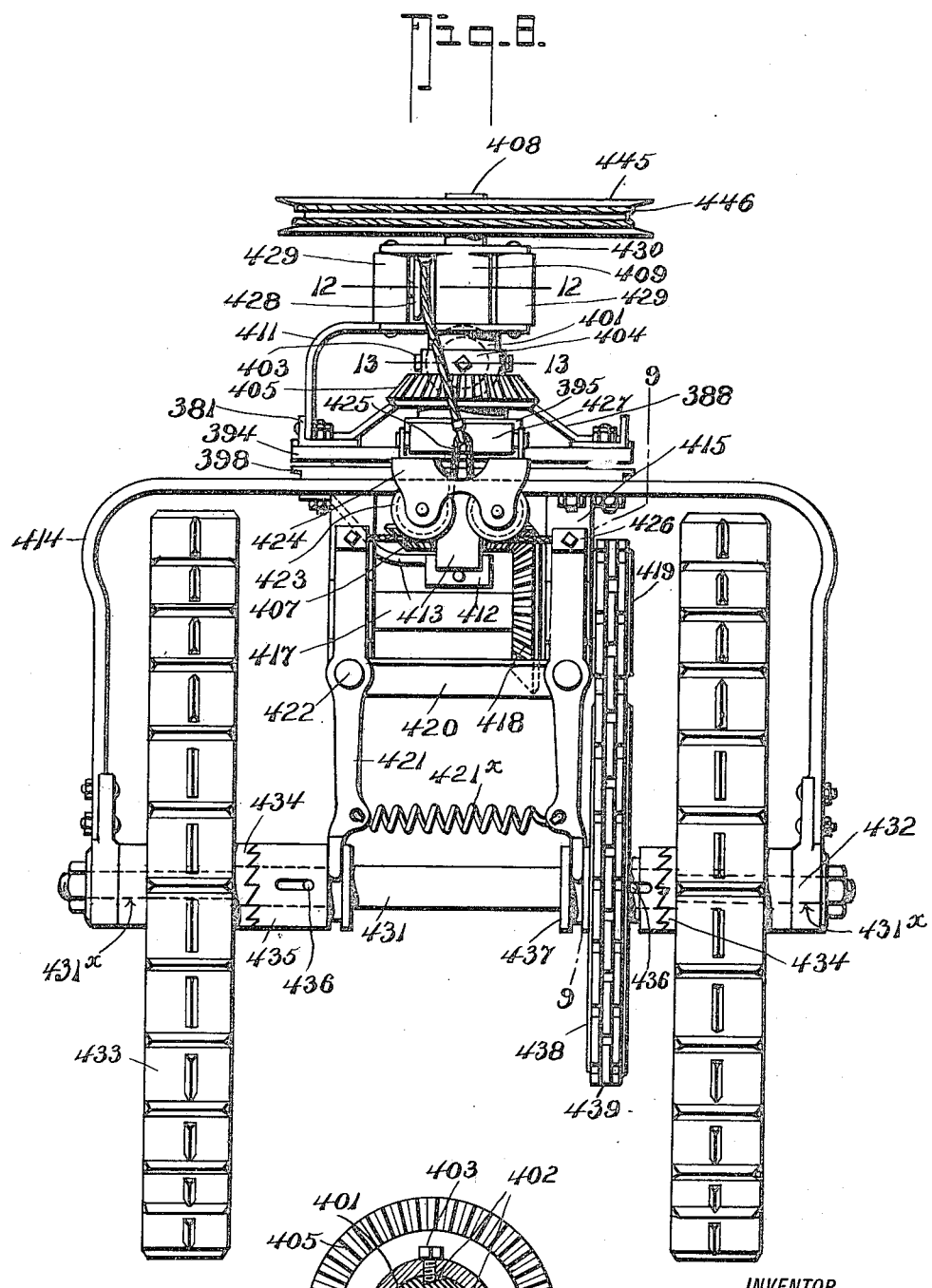

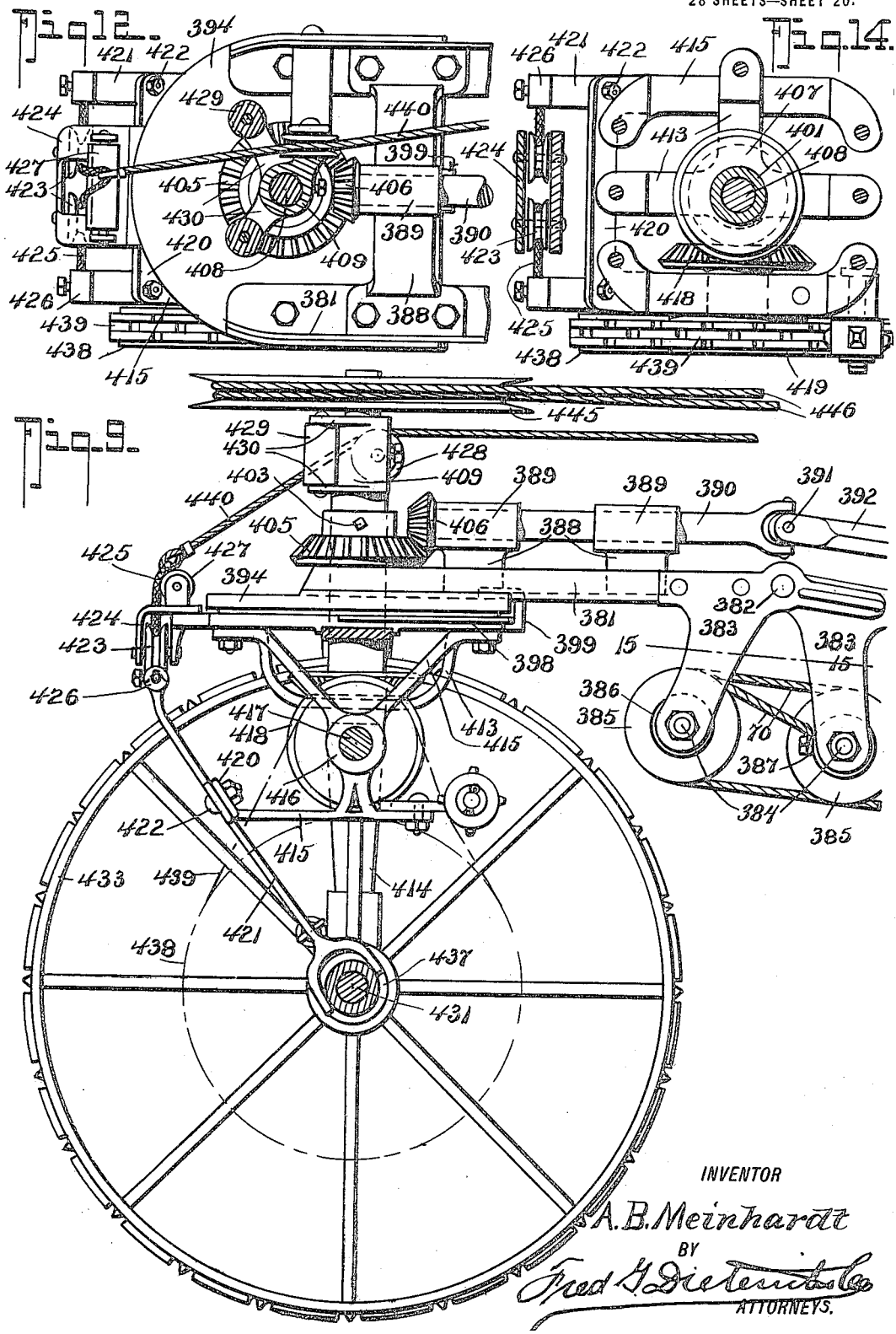

A. B. MEINHARDT.
HARVESTER.
APPLICATION FILED DEC. 30, 1915.
1,223,999.
Patented Apr. 24, 1917.
28 SHEETS—SHEET 21.
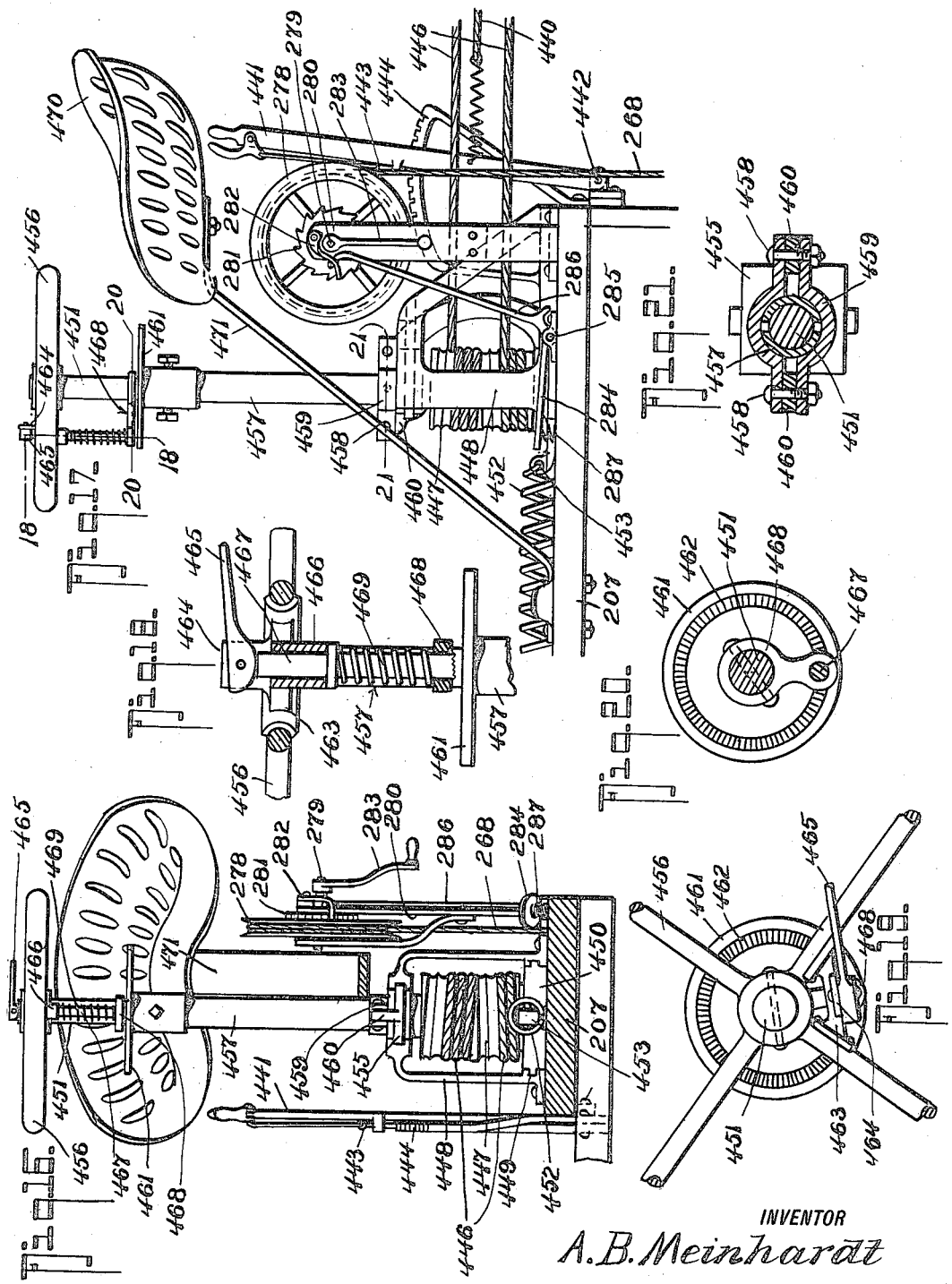
INVENTOR
A. B. Meinhardt
BY
Fred G. Dieterich
ATTORNEYS.

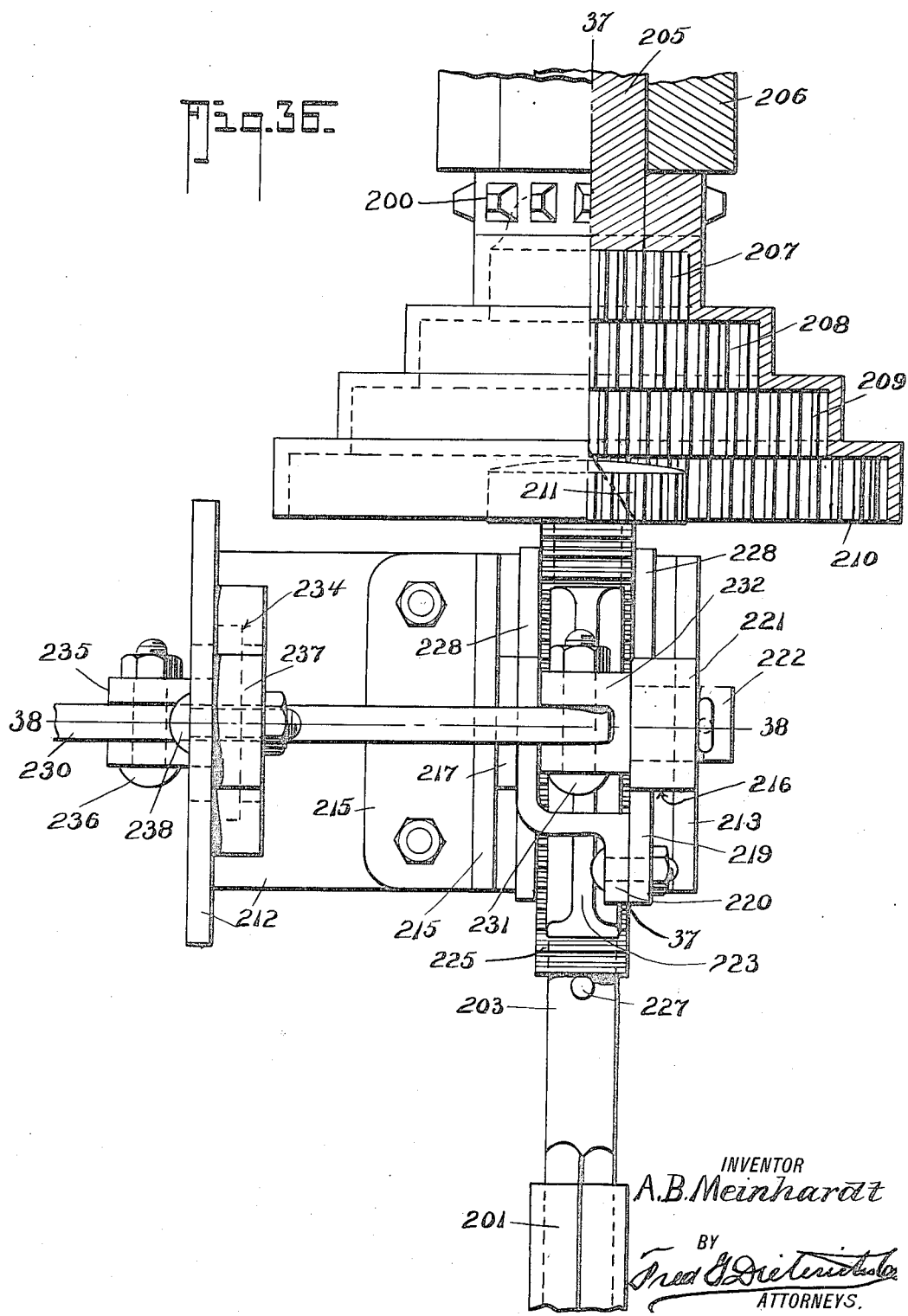

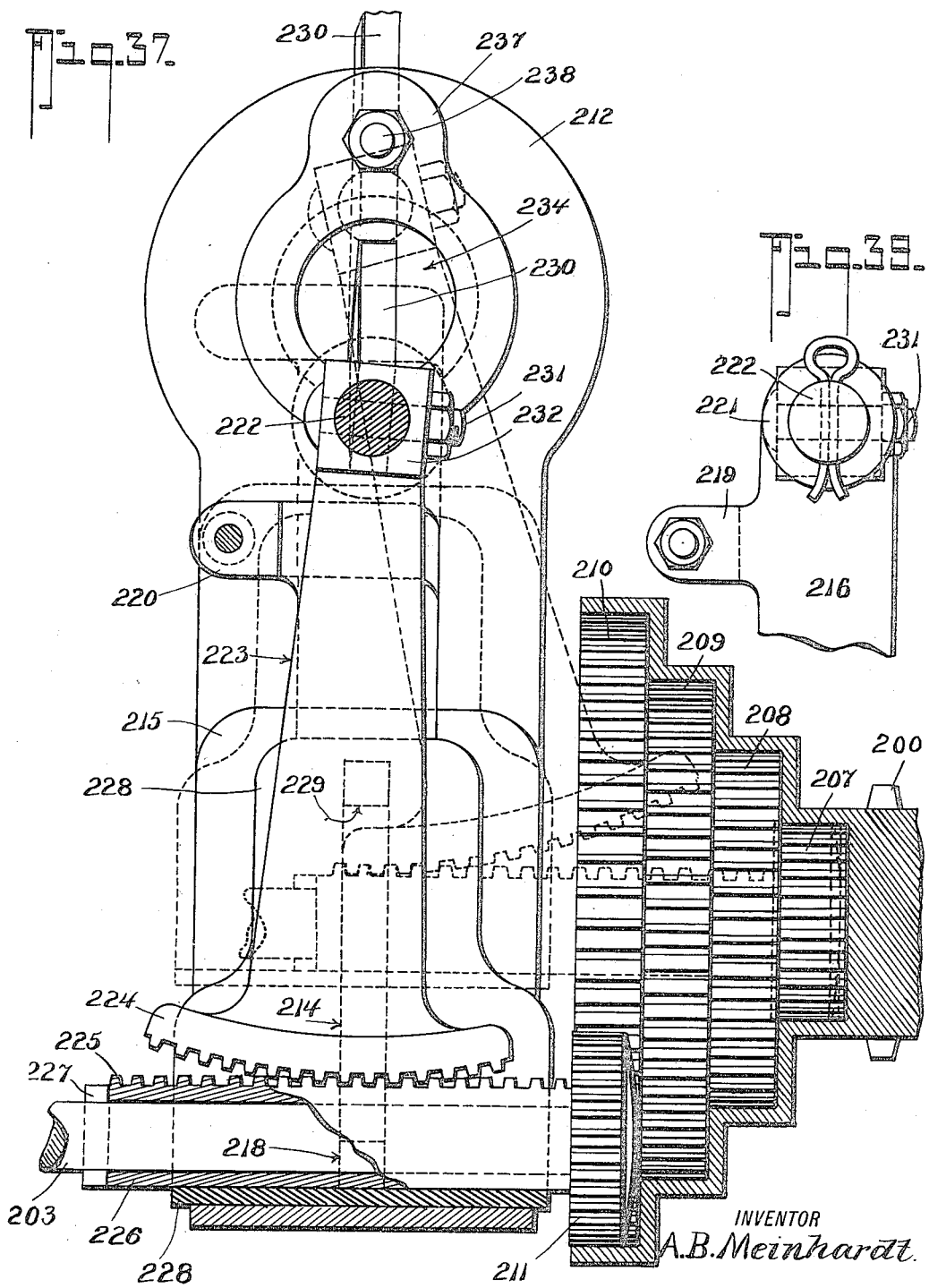

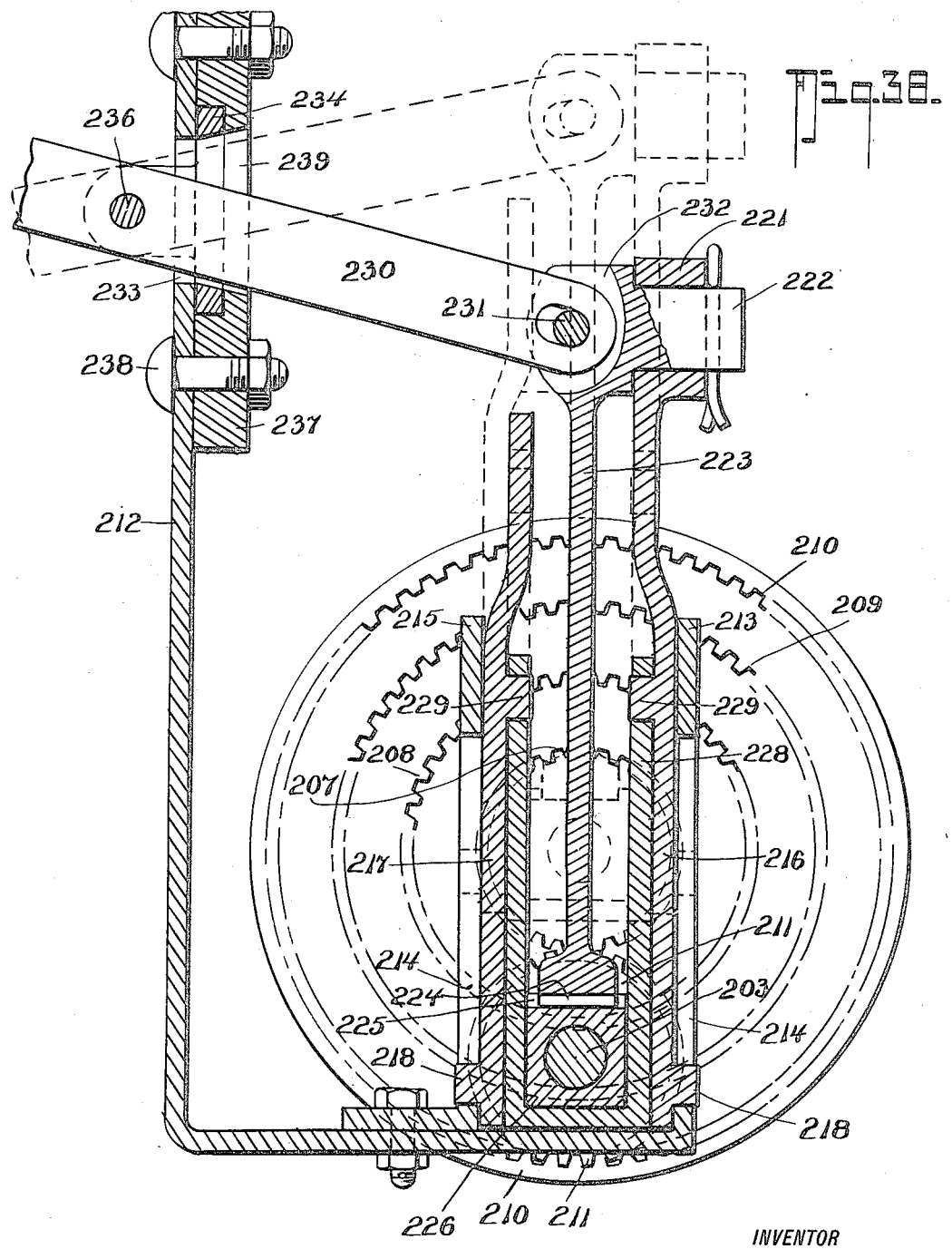

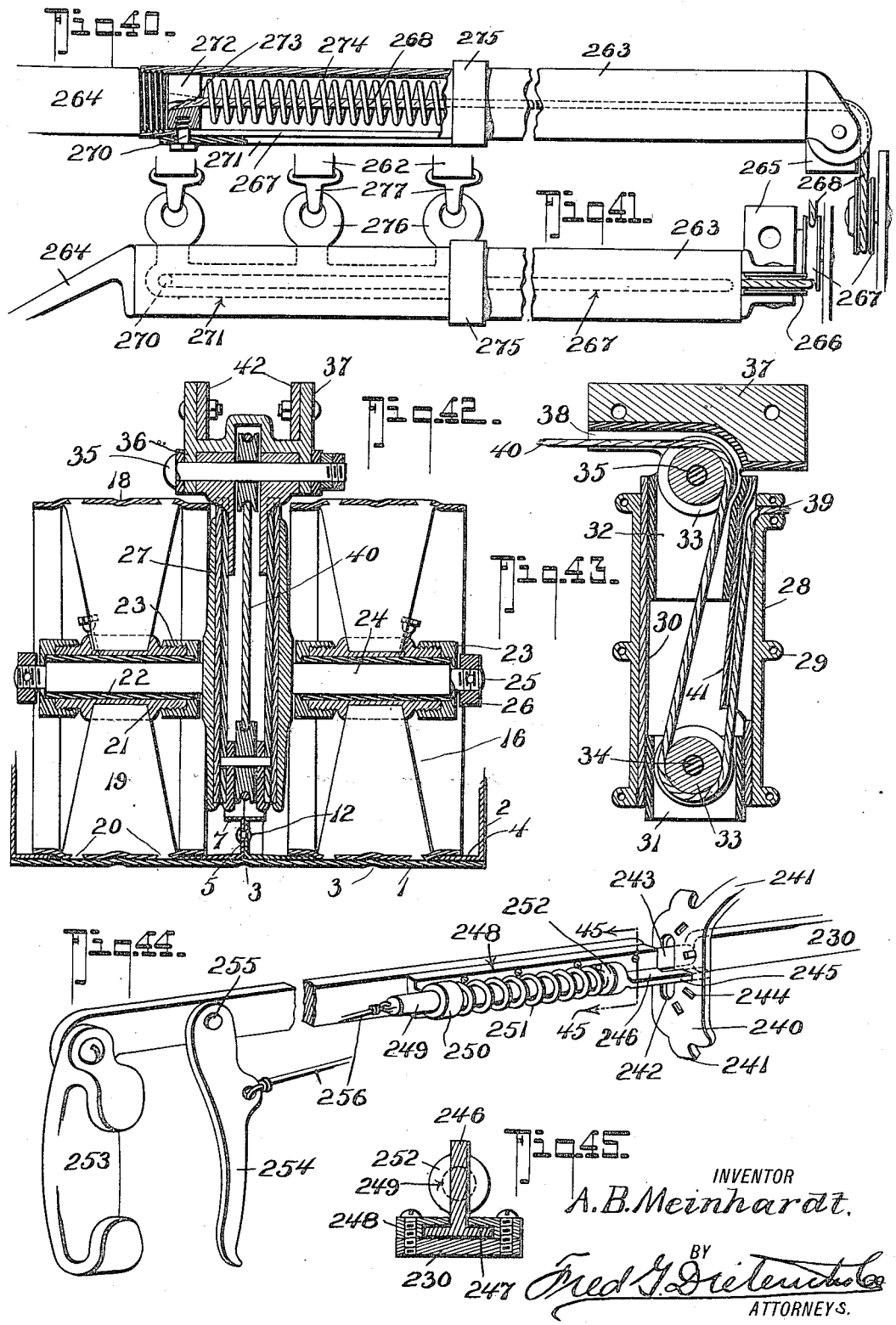

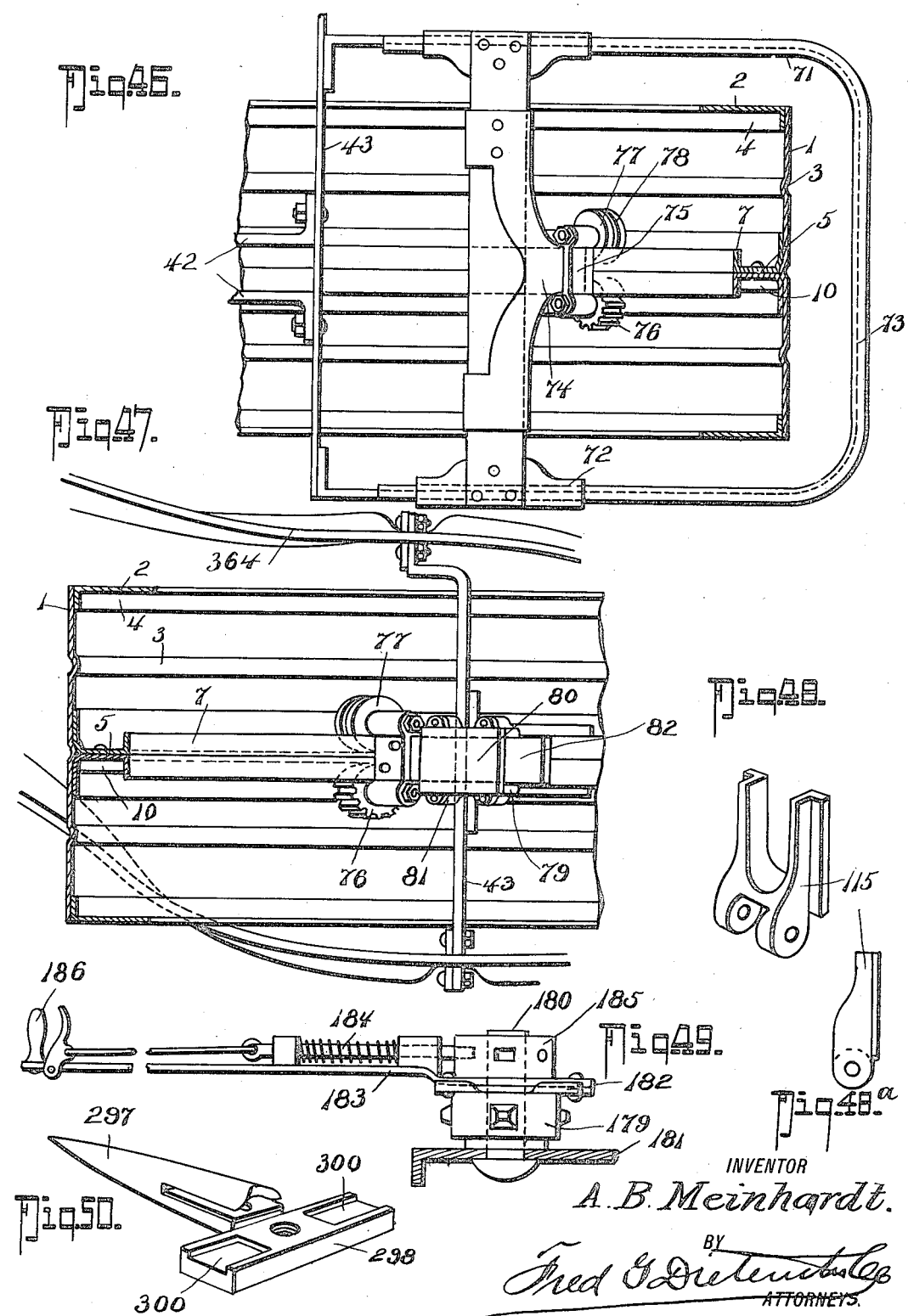

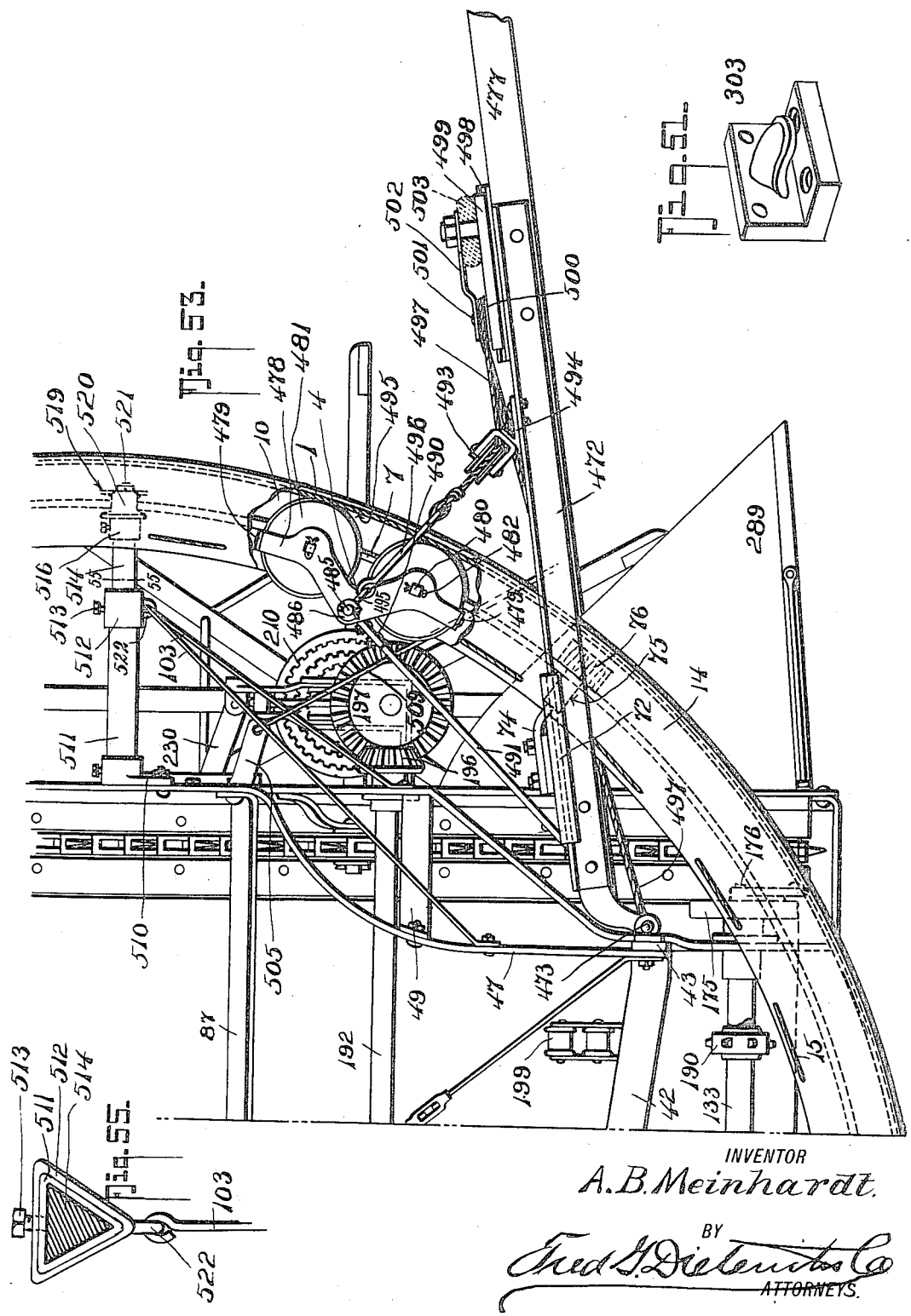

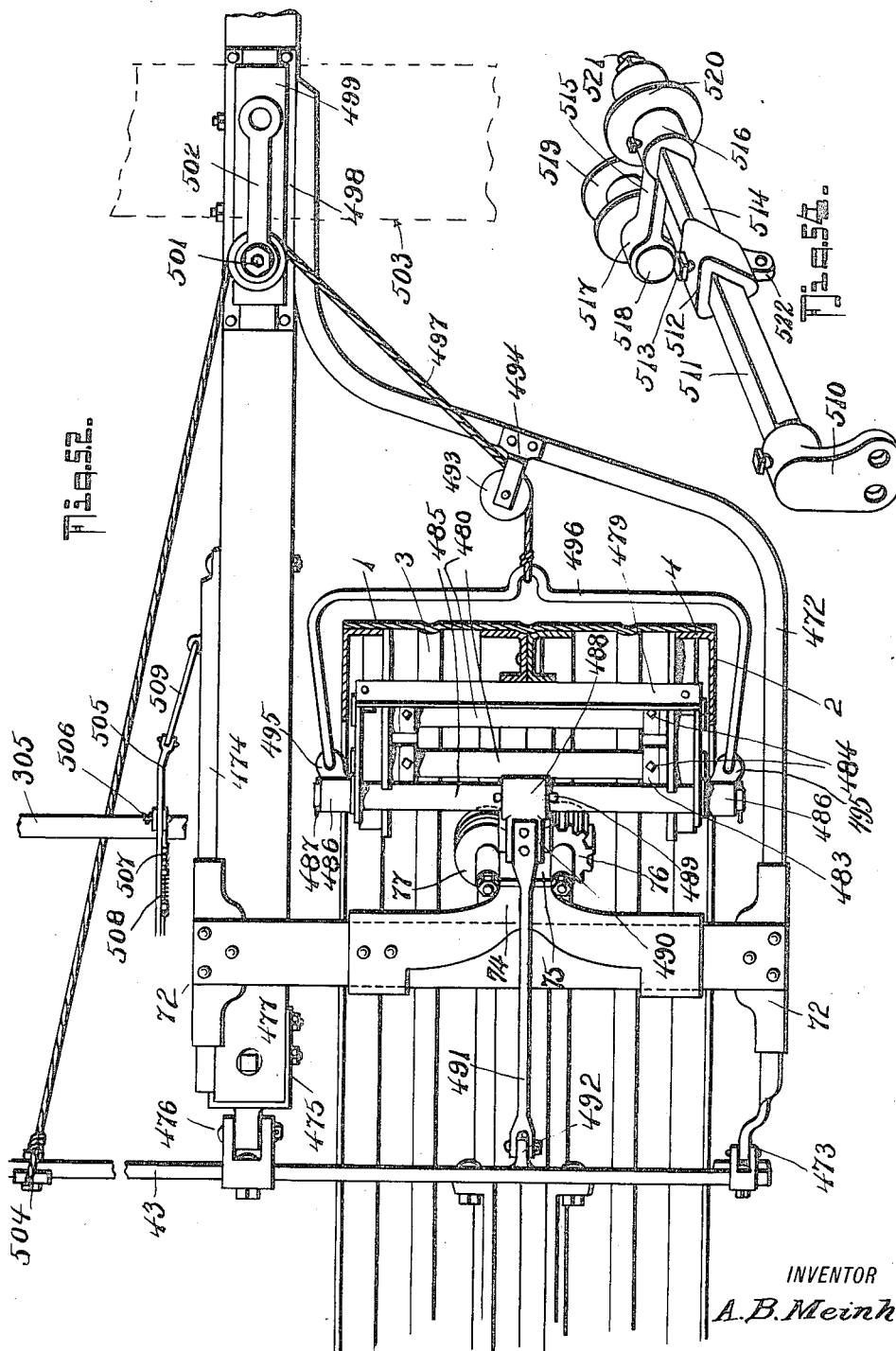

UNITED STATES PATENT OFFICE.

ADAM B. MEINHARDT, OF PAXICO, KANSAS.

HARVESTER.

1,223,999.  Specification of Letters Patent.  Patented Apr. 24, 1917.

Application filed December 30, 1915. Serial No. 69,469.

*To all whom it may concern:*

Be it known that I, ADAM B. MEINHARDT, residing at Paxico, in the county of Wabaunsee and State of Kansas, have invented certain new and useful Improvements in Harvesters, of which the following is a specification.

My invention is an improved harvester of the spokeless wheel kind and it is one of the objects of the present invention to provide a harvester, the principal weight of the machinery of which is sustained by a wide tread wheel rim that forms the traction wheel or principal driver of the harvester, the propelling function being augmented by a trailing truck (in the self-propelled form especially) by which the machine may be turned around or guided in its course.

Again, the invention provides a propelling mechanism with a reversible drive whereby the machine may be moved forwardly or backwardly, thus providing, in connection with the trailer or steering truck, an effective means for manipulating the machine not only on the field but in taking the machine from place to place.

Again, it is an object of the invention to provide a harvester which will not readily mire into soft ground but which may be effectually used on soft ground, thereby enabling the saving of much grain in a wet season, a thing quite impossible with the ordinary types of harvesters now in common use.

Another object of the invention is to provide for operating the various trailing devices, adjusting mechanism, etc., from a single location, as it were, namely all of the trailing levers, wheels, adjusting devices or operating members, etc., are arranged within easy reach of the operator while seated.

Furthermore, it is an object of the invention to provide a self-adjusting elevator so designed as to automatically adapt itself to the variations in the grain, thus allowing the grain to pass evenly at sudden changes from light to heavy grain and thereby preventing the choking of the elevator.

I have also provided an improved regulator or adjustment for the grain head straps, whereby they can be readily and conveniently manipulated by the operator during the running of the machine, for long and short grain, the operator being thereby enabled to adjust the straps while the harvester is in full operation and thus do away with the necessity of stopping the machine in order to effect the adjustments when desired. Furthermore provision is made in the form of a special knife guard and knife cap to allow the knife bar to be located quite close to the platform canvas, thereby elevating short grain in better shape and form than is possible in those harvesters now in common use and in which the knife bars are located at too great a distance from the platform canvas.

Again, the invention provides means, in connection with the platform canvas, whereby the butt ends of the grain, as well as the head ends, are carried evenly onward to the elevating canvas, a thing that is of considerable benefit, and is not obtainable by any of the harvesters now in common use with which I am at present familiar.

My invention further provides means, under control of the operator, whereby the speed of the reel may be varied, as desired, for the reason that, the employment of a one-speed reel (the common practice in harvesters in use today) causes much of the grain to be thrown to the back end of the platform canvas and the grain, being there elevated, finds it way into the bundle above the tie band, thus providing unbound grain in the bundles which becomes lost as scatterings in the field when a bundle is handled. This objectionable feature is avoided by the employment of my invention.

The present invention also provides a sprocket chain butt carrier in connection with the elevator for the purpose of elevating the butt ends more evenly with the grain head, resulting in a well bound straight bundle and preventing formation of ragged bundles and also preventing the knife and the end of the platform below the elevator from being choked by tangled grain.

A part of the invention also resides in the provision of a caster-swing grain wheel with means under the operator's control for raising and lowering the platform with relation to the caster-wheel, the provision of the caster-swing grain wheel enabling the machine to be readily turned about without cutting a deep rut or drilling a hole when the ground is soft, a fault too commonly found in many harvesters now in use.

The invention includes mechanism, operating in connection with the guide truck, the caster-wheel and the traction wheel supports whereby the machine may be raised or lowered and leveled as to position of the platform and cutting mechanism with relation to the ground, all being manipulated and controlled by the operator from his position on the seat.

In its general make-up the invention, among other things, comprises a spokeless tractor wheel having an internal guide, gear flange and runway, in which runway supporting wheels of the body frame run; the body frame is sustained opposite the traction wheel, (i. e., on the grain side) by a caster wheel, and at the rear by a trailer truck (or when horse draft is used the function of the trailer truck is vested in the horses) giving thereby, as it were, a three-point support, there being means provided whereby the frame may be raised and lowered to bring the platform canvas and the cutting mechanism (which are sustained by the frame) closer or farther from the grain as desired; power transmitting driving gear is provided on the frame, the same including a front and back set of driving and supporting elements, there being also provided supplemental supporting or sustaining rollers coöperative with the spokeless wheel and the frame at points below the driving pinions; means are also provided to allow the driving and sustaining pinions and rollers to adjust themselves to maintain their proper position with relation to the spokeless wheel when the frame is raised or lowered on its "points of support", the raising and lowering being effected by mounting the supporting elements with adjustable brackets or devices by which, while the supporting elements themselves remain in relatively fixed relation with respect to the ground, the frame may be raised and lowered as desired; the trailing truck is provided with driving gear and is coupled with the driving mechanism of the machine by a propeller shaft and universal joint and it is provided with clutches whereby, when the operator desires he may disconnect the propelling mechanism of the spokeless wheel and using the vertical axis of such wheel as a turning axis, engage the driving elements of the trailing truck to propel the machine in a circle to turn it around in a short narrow space, the trailing truck driving mechanism being designed to be thrown out of gear to free the truck wheels when desired by the operator, and means are provided with a control in convenient reach of the operator, whereby he can turn the truck on its axis to any angle desired before throwing in the driving gear, thereby enabling the machine to be turned, as before stated, on the vertical axis of the spokeless wheel as a center, or in a circle of greater radius, if desired.

The invention also resides in those novel details of construction, combination and arrangement of parts, all of which will be first fully described, and then be specifically pointed out in the appended claims, reference being had to the accompanying drawings, in which:—

Figure 1, which is composed of Figs. $1^A$, $1^B$, $1^C$, $1^D$ and $1^E$, constitutes a top plan view of my complete machine, the several sub-figures being read together as one by joining lines $cx$, $cy$ of Figs. $1^A$, $1^B$, $1^C$, $1^D$, with the point $c$ located in the center, and by joining the lines $m$—$m$ in Figs. $1^C$ and $1^E$.

Fig. 2, which is composed of sub-figures $2^A$, $2^B$, $2^C$ and $2^D$, is a side elevation of the machine proper, being the forward part of the harvester viewed from the right hand or spokeless wheel side; these sub-figures $2^A$, $2^B$, $2^C$, $2^D$, may be read as one by joining the letters $cx$, $cy$, having $c$ as the center.

Fig. 3, which is composed of Figs. $3^A$, $3^B$, $3^C$ and $3^D$, constitutes a side elevation of the forward part of the harvester as viewed from the left hand or grain side.

Fig. 4, which is composed of Figs. $4^A$, $4^B$, constitutes a cross section on substantially the line 4—4 of sub-figures $2^B$—$2^D$, and looking rearward, sub-figures $4^A$—$4^B$ are to be read as one by joining the letters $n$—$n$.

Fig. 5 is a front elevation of a portion of the harvester.

Fig. 6 is a rear elevation of a portion of the harvester, the trailer truck connecting frame being shown in cross section.

Fig. 7 is an enlarged top plan view of the trailer or guide frame showing the hinge part of the connecting frame and the controlling cables.

Fig. 8 is a rear elevation of the trailer or guide truck.

Fig. 9 is a vertical section on the line 9—9 of Fig. 8.

Fig. 10 is a detail vertical section on the line 10—10 of Fig. 7.

Fig. 11 is a cross section on the line 11—11 of Fig. 10.

Fig. 12 is a horizontal section on the line 12—12 of Fig. 8.

Fig. 13 is a horizontal section on the line 13—13 of Fig. 8.

Fig. 14 is a horizontal section on the line 14—14 of Fig. 11.

Fig. 15 is a horizontal section on the line 15—15 of Fig. 9.

Fig. 16 is a detail front elevation of the operator's seat, the steering wheel and cable drum, the grain head strap controlling and operating wheel and the trailer truck gear clutch manipulating lever.

Fig. 17 is a side elevation of the parts exhibited in Fig. 16.

Fig. 18 is an enlarged detail vertical section on the line 18—18 of Fig. 17.

Fig. 19 is a detail top plan view of a portion of the steering wheel showing the holding devices.

Fig. 20 is a detail horizontal section on the line 20—20 of Fig. 17.

Fig. 21 is a detail horizontal section on the line 21—21 of Fig. 17.

Fig. 22 is an enlarged detail elevation of the upper elevator gearing.

Fig. 23 is a detail cross section on the line 23—23 of Fig. 24.

Fig. 24 is an enlarged section on the line 24—24 of Fig. 22.

Fig. 25 is a detail horizontal section on the line 25—25 of Fig. 3.

Fig. 26 is a detail vertical section showing the main shaft clutch mechanism by which power is applied from the driving sprocket, either to the spokeless wheel propeller or to the rear propeller shaft that drives the trailer truck.

Fig. 27 is a detail vertical section of the clutch devices for connecting and disconnecting the knife bar driving shaft from the power applying elements.

Fig. 28 is a detail perspective view of a portion of the driving rack of the spokeless wheel.

Fig. 29 is an enlarged detail cross section of a portion of the spokeless wheel showing the construction of the driving rack, the guideway and the retaining flanges.

Fig. 30 is a detail cross section on the line 30—30 of Fig. 6.

Fig. 31 is a horizontal section on the line 31—31 of Fig. 30.

Fig. 32 is a vertical longitudinal section of a portion of the grain butt end elevator chain.

Fig. 33 is a front elevation of a portion of such elevator chain.

Fig. 34 is a detail elevation showing how the leveling bar is secured to the connecting frame of the rear or trailer truck.

Fig. 35 is a horizontal section on the line 35—35 of Fig. 34.

Fig. 36 is an enlarged top plan view and part horizontal section of the reel gear drive and speed changing mechanism.

Fig. 37 is a vertical section on the line 37—37 of Fig. 36.

Fig. 38 is a vertical section on the line 38—38 of Fig. 36.

Fig. 39 is a detail elevation of a portion of the mechanism shown in Fig. 36.

Fig. 40 is a detail elevation (parts being broken away) of the grain head strap regulator.

Fig. 41 is a top plan view of the grain strap regulator.

Fig. 42 is a detail vertical cross section on the line $c$—$x$ of Fig. $2^D$.

Fig. 43 is a detail vertical section of a part of the mechanism shown in Fig. 42.

Fig. 44 is a detail perspective view of the reel gear shifting rod and the latch and latch plate coöperative therewith.

Fig. 45 is a cross section on the line 45—45 of Fig. 44.

Fig. 46 is a detail cross section and plan view showing the lower front guy rollers and their self-adjusting supports.

Fig. 47 is a detail plan view and section showing the lower rear guy rollers and their supports.

Fig. 48 is a detail view showing one of the reversing gear shifting wedges of the drive shafts.

Fig. $48^A$ is a side elevation of the part shown in Fig. 48.

Fig. 49 is a detail perspective view of the drum operating crank and sprocket device.

Fig. 50 is a detail perspective view of one of the guard fingers.

Fig. 51 is a detail perspective view of one of the knife guards.

Fig. 52 is a detail plan view showing the draft attachments when horse power is used.

Fig. 53 is a detail side elevation, parts being broken away, of the mechanism shown in Fig. 52.

Fig. 54 is a detail perspective view of one of the connections between the frame and the spokeless wheel for bracing and guiding the wheel with relation to the frame.

Fig. 55 is a detail cross section on the line 55—55 of Fig. 53.

Referring now to the accompanying drawings, in which like letters and numerals of reference indicate like parts in all of the figures, it will be noticed that the invention comprises, among other things, a spokeless traction wheel which consists of a broad flat rim 1 to which internal side flanges 2 are fastened. The rim is preferably beaded, as at 3, to give the necessary strength as well as to form "tracks" for the supporting wheels 16 of the body frame (see Figs. $4^B$ and 42). The flanges 2 are formed of angle irons, the annular portions 4 of which are secured to the rim and are engaged by the reduced side flanges 17 of the rims of the supporting wheels 16.

As best illustrated in Figs. $4^B$, 28, 29 and 42, it will be noticed the spokeless wheel also embodies a central web and flange to form guyways, in one of which the driving gears are located. This web is composed of two web plates 5 having rim flanges 6 tha* are suitably (in any desired way) fastened to the rim 1, and have opposite inner flanges whereby to form, as it were, two channelways, one at either side of the web 5—5.

10 designates the gear, which may be formed of sheet metal, and has lugs 9 to fit into the openings 8 in one web 5, the gear body having countersinks 11 to receive the heads at one end of the rivets 12 which fasten the webs 5—5 and the gear body 10 together (see Fig. 29).

The space between side flanges 2 and the central flange 5—5 constitutes the runways for the body frame supporting wheels 16. The side flanges also have holes 13 by means of which a surface covering 14 of burlap, or other suitable material, may be sewn on the wheel as at 15, to prevent mud adhering to the wheel face and also to give better traction, thus preventing the wheel from slipping.

The supporting wheels (see Figs. 4ᴮ and 42) have annular grooves 18 to receive the runway beads 3, the side portions 17 running on the rim portions of the side flanges 2 and on the base flanges 6 of the central web.

The wheel 16 has spokes 19 which are riveted at 20 to the rim. At their inner ends, the spokes are set into hubs 21 which are bushed at 22, capped at 23, and fit on the spindles 24 that project laterally from either side of the shiftable support. The wheels 16 are retained on the spindles by their threaded shanks 25 on which the nuts 26 are located.

The shiftable support is composed of the side spiders 27 that are carried by the tubular body. This body is formed of two parts 28 having ears 29 fastened together. In the outer body there is located another tubular body 30 which is vertically shiftable by a block and tackle arrangement. Sheave carriers 31—32 are secured in the bottom and top respectively of the tubular body 30. The lower sheave 33 is journaled on a pin 34, while the upper sheave 33 is journaled on the bolt 35 that pivotally connects the telescoping support 28—30 to the U-shaped bracket 37 through the ears 36. The bracket 37 is bolted to the longitudinal bars 42 of the body frame and it has a guard 38 for the cable 40. The cable, after passing over sheaves 33, has one end secured at 39 to the outer body 28. The inner body 30 has also a guard 41 (see Fig. 43).

The body frame consists, principally of the longitudinal bars 42—42 which are located in the plane of the spokeless wheel, the front and back lower bars 43—43 which extend horizontally from one of the sides of the wheel, then downwardly at 44, and finally horizontally again at 45 to join with the side bar 46 on the outer side of the platform.

The body frame also includes the end standards 47—48 which support the drive shafts and to which the upper lateral bars 49 are fastened. The bars 49 extend to a position at the inner side of the platform and are there connected with the lower bars 45 by stands 50 (see Figs. 4ᴮ 5 and 6).

51 is a bar which is fastened at 52 to brackets 53 that extend up from the bar 46 and to the fixed guide 54 of the caster wheel connection.

The outer or grain side of the body frame and platform portion thereof is carried on a wheel 55 that is journaled on an arm 56 which is fulcrumed on a vertical axis at 57 on the sliding frame 58. A knob 131 is cast on the arm 56 and a knob 134 is cast on the sliding frame 58, which knobs act to stop the swinging arm 56 in its movement and prevent the caster wheel from swinging around too far so as to interfere with the machinery adjacent thereto.

The frame 58 is sustained by a cable 60 that has one end fastened at 59 and passes over a sheave 61 on a bracket 62 which is carried by the guideway 54 (see Fig. 3) and is thence passed over another sheave 63 that is mounted on the frame 58.

This cable 60 passes over a sheave 54 on the frame to one section 65 of a drum that is journaled in bearings in the rear standard 48 and in an auxiliary standard 68 (see Fig. 2ᶜ); the standard 68 is secured to the lower cross bar 43.

The cable 40 also passes over an idler 69 (see Fig. 4ᴮ) and is secured to another section 66 of the drum; to the third section of the drum, the hinge operating lever 70 of the trailer connecting the auxiliary frame is secured (see Fig. 2ᶜ).

At the front of the machine is a yoke 71 which embraces the spokeless wheel and has its ends fastened to the front lower cross bar 43, the yoke having a flange 73 along which the cross slide 72 is movable. The slide 72 carries the arm 74 which has the bearing 75 for the guy rollers 76—77, one of which (see Fig. 46) is gear-faced and the other is smooth except for a groove 78 to pass over the heads of the rivets 12.

79 is a supporting slideway that is fastened to the lower rear cross bar 43 and consists of two parts 79—80 having ears 81 through which they are fastened together. The bar 82 carries the rear guy rollers 76—77 (see Figs. 2ᶜ and 47) and is slidable in the support 79 for purpose of self-adjustment when the frame is raised and lowered. The drive shaft by which (when motor driven) the spokeless wheel is turned, is composed of two sections 83—84. The section 83 (see Fig. 2ᶜ) is mounted in a bearing 85 on a longitudinal bar 87 (that is fastened at its ends to the standards 47—48) a bearing 86 that is mounted on the rear standard 48, and a bearing 88 that is supported by a bar 91 from the bearing 86 and by guy rods 89—90 fastened to the frame of the machine.

93 is a bracket which has a stepped bearing 92 for a purpose later explained. The bracket 53 has an arm 94 which is secured to the bar 42 and it has an upper vertical extension 95 to carry the bearings 96—97 for the adjacent ends of the driving shaft extensions 83—84.

Each shaft section 83—84 has gears 98 which are slidable with relation to each shaft (the shafts having keyways 99 to engage the keys) and the said gears 98 are held from lateral movement by the bearings 96—97 and by a bracket arm 100, (see Figs. 2$^C$ and 2$^D$).

The shaft 84 (see Fig. 2$^D$) is also mounted in a bearing 101 that is fastened to the front standard 47 and in a bearing 102 that is sustained by guy rods 103 and a bar 104, the latter joining the bearings 101 and 102. Each shaft section carries a double bearing 105 (see Fig. 26) which is held from swiveling by a bar 106 that works in a slotway 107 in the bearing 105. The double bearing 105 has a part 108 for the shaft 83 and another 109 for the stub shaft 110. The stub shaft carries the retaining guy roller 111, such roller having a smooth face except for a groove to pass over the heads of the rivets 12. The shafts 83—84 have drive pinions 112 to engage the gear 10 (see Fig. 26).

The shaft 83 is provided with a pair of pinions 113 which are slidable longitudinally on the shaft and are pressed apart by a spring 114, it being understood, however, that the gears 113 have keys to enter the keyway 99 of the shaft 83 so that the gears 113 are turned with the shaft 83. The gears 113 are alternately shifted into engagement with the gear 121 on the transmission shaft 122 by the wedges 115 which operate in slideways 116 and are linked at 120 to a rocking bar 117 which is fitted at 118 to the upper bearing 119 for the shaft 122. The bearing 119 is secured to the longitudinal bar 87.

The transmission shaft 122 has a gear 123 that continually meshes with a gear 125 on the driving shaft 126. The adjacent ends of the shafts 122 and 126 are mounted in the step bearing 92. 124 designates guy rods for bracing the bar 87, the rods 124 being provided with swivels as indicated, for the usual purpose.

The shaft 126 is journaled in a bearing 127 that is secured to the rear standard 48 and has a reduced end 128 on which the driving gear 141 is loosely journaled, the gear being held in place by the shoulder formed by the reduced end 128 and the shaft proper 126 and by a cap 130 which is threaded onto the threaded extension 129 of the shaft end 128, the cap 130 being pinned at 140 to the threaded extension 129. The cap 130 also serves as a bearing for one of the shifting clutch elements 155 that has a pin and slot connection with the rear propeller shaft 156.

142 is a shifting clutch element that has a pin and slot connection 143 with the shaft 126, and has a clutch face 146 to engage the opposite clutch face 144 of the driving sprocket 141, the driving sprocket also having a clutch face 145 to engage the opposing clutch face 139 of the clutch 155. 147 is a clutch shifting yoke having forks 148—154 respectively to engage the shiftable clutch elements 142—155 respectively, the yoke 147 having guides 150—151 to enter bearing apertures in the standard 48 and the brace 152. 149 is a rack section carried by the yoke 147 to be engaged by the pinion segment 159 of the operating rod 158.

153 is a bearing for the propeller shaft 156 which bearing is supported by braces 152 from the cross bars 43—49 of the machine. The operating rod 158 is suitably mounted in bearings and extends to a place in convenient reach of the operator where a handle 160 is provided with a latching device 138 to engage the support 137 and hold the rod 158 in its positions of adjustment so as to hold either the clutch 142 into engagement with the sprocket 141 or both clutches out of engagement, as shown in Fig. 26.

The shaft 126 is provided with a sprocket 136 over which the chain 135 is passed, the chain 135 also passing over a sprocket 134 fixed on the knife bar operating shaft 133.

The rocking bar 117 that operates the wedges 115 (see Fig. 2$^C$) is itself operated by a connection 161 with a lever 162 (see Figs. 2$^C$ and 4$^B$) which is fulcrumed at 163 and is provided with a retaining latch device 164 to hold the lever in its different positions.

The knife bar operating shaft 133 is journaled in a bearing 164 (see Fig. 27) and is provided at its end with a drive sprocket 165. The sprocket 165 has a clutch face 166 which is adapted to be engaged by the clutch face 167 of the shifting clutch sleeve 168 that runs loose on the shaft 133. 169 is a sprocket wheel that is slidable on the sleeve 168 but turns with it for a purpose presently explained. The sleeve 168 may be shifted to engage the clutch elements 166—167 or disengage them, as desired, by a yoke 170 that has a gear rack 171 to be engaged by the gear segment 172 on the operating rod 173, the rod 173 extending to a place in convenient access to the operator and being provided with a handle 174 and latch device 175 to engage the bracket 137 (see Fig. 4$^B$).

At the front end of the machine, the shaft 133 is provided with a crank disk 175 (see Figs. 2$^D$, 5 and 1$^D$) the disk 175 having a crank pin 176 to which the pitman 177 is connected, (see Fig. 5).

The drum 65—66—67 has its shaft provided with a large sprocket wheel 177 over which the operating chain 178 passes, the chain being driven by a sprocket 179 on a stud 180 carried by a bracket 181. The sprocket 179 is secured by lugs and rivets 182 to the crank 183, the crank being provided with a handle 186 and a latch device 184 which engages the notches in the drum 185 that is fastened to the stud 182 (see Figs. 6 and 49).

The chain 178 is kept taut by a tension wheel 188 that is adjustably fastened at 187 to one side-board of the elevator (see Fig. 6).

The tension of the chain 195 may be adjusted by the roller 162 (see Figs. 3ᴰ and 6).

The shaft 133 has a sprocket to drive the binder (not shown) and chain guides 199 are also provided to engage the binder driving chain (also not shown). As the binder mechanism may be of any approved type and *per se* constitutes no part of the present invention, illustration thereof is thought to be unnecessary.

192 is the reel driving shaft which is mounted in bearings 193 (see Figs. 2ᶜ and 2ᴰ) and has a sprocket 194 (see Figs. 2ᶜ and 6) over which the driving chain 195 passes. At its front end, the shaft 192 has a beveled gear 196 that meshes with a bevel gear 197 (see Figs. 1ᴰ and 2ᴰ) on a transmission shaft 198 that is journaled in a bearing 202 and comprises the telescoping sections 201 203, and universal joints 199. 203 is the pinion carrying shaft of the change-speed gear mechanism (see Figs. 36, 37 and 38).

By reference to Figs. 36 to 39 inclusive, the construction of the reel change-speed gearing, which constitutes a part of my present invention, will be clearly understood. The reel 294 (see Figs. 1ᴮ—1ᶜ) is of any desired type and may have its shaft secured to the shaft which is journaled in a bearing 206 on the end of the upper or operator's platform 207ˣ (see Figs. 1ᴮ and 36). While for purposes of illustration, I have shown a reel coupled directly with the gearing 207, etc., yet, as I make no claim *per se* to the reel construction, I desire it understood that any well-known or approved type of reel may be used, either a reel of the relatively permanently located type, or a reel of the adjustable type, which is swingably sustained to be raised or lowered and when the latter type of reel is employed its shaft may be driven by a sprocket chain (not shown) taking over the sprocket 200.

The shaft 205 has a set of internal gears 207 and 210 inclusive on it, the gears increasing progressively in diameter from the smaller gear 207 to the largest gear 210, the several gears being preferably formed in a single shell and they are designed to be engaged by the driving pinion 211 on the shaft 203. 212 is a bracket support (see Figs. 36 and 38) which has a fixed standard 213 with a vertical slot 214 and which also has a removable standard 215 with a similar slot 214. A vertically shiftable frame composed of sections 216—217, having lugs 218 to enter the slots 214, serves to sustain the pivoted gear advancing and withdrawing sector 223. The frame section 216 has a lateral arm 219 (see Fig. 39) to which the yoke arm 220 (see Fig. 37) is bolted and it also has an upward extension that terminates in a bearing 221 (see Fig. 38) for the stub shaft 222 of the gear shifting sector. The sector 223 has a gear cut face 224 (see Fig. 37) to engage the rack 225 of the box 226 in which the shaft 203 is journaled, the shaft being held from movement axially, in the box by a pin 227. The box 226 is slidably carried in a sling 228 which is suspended on lugs 229 that project from the opposing frame sections 216—217.

The gear 211 is raised and lowered and shoved in and out, to engage any one of the gear surfaces 207—210 inclusive, by a lever 230 that has a pin and slot connection 231 with the gear sector fulcrum end 232, the said end being bifurcated to receive the end of the lever.

The lever 230 is so mounted as to have a turning movement on its longitudinal axis and also a pivoted movement up and down, as will be clearly seen by reference to Figs. 1ᴰ, 36, 37 and 38. The bracket 212 has a hole 233 through which the lugs 235 from a ring 234 project. The ring 234 is held to swivel on its axis by a plate 237 that is held over it by bolts 238, the plate having a hole 239 for the lever to work through. As the lever 230 is held to its different positions by a latch device, the construction of which is best shown in Figs. 44 and 45, by reference to which it will be observed that a plate 240 is sustained by arms 241 in a fixed position and it has a vertical slot 242 through which the rounded part 243 of the lever 230 passes. The plate 240 also has position determining recesses 244 for the latch finger 245 of the latch 246. The latch 246 has a flange 247 to operate in the slideway 248 and it also has a rod portion 249 to move in the bearing 250, the latch being projected by a spring 251 located between the bearing 250 and a collar 252 on the rod 249. The lever 230 has a handle 253 adjacent to the operator's seat, and it also has a latch operating lever 254 fulcrumed at 255 and connected by a rod 256 with the latch member 249.

257 is the platform canvas or conveyer which, in its general nature (except as later explained) is of the usual construction, being driven through a shaft 258 and sprocket 259 from the main driving chain 195. The canvas has the usual slats 260 and in order to effect a more even conveying of the grain stalks to the elevator, I provide one or more oval knobs 261 on the canvas between the slats (see Figs. 1$^B$ and 2$^C$).

262 designates the grain head straps (see Fig. 1$^B$) of which one or more may be used, and in order to adjust the said straps for different height grain, while the machine is in operation in the field, I have invented a mechanism which is best shown in Figs. 3$^C$, 3$^D$, 40 and 41, by reference to which it will be noted that I provide, on the outer side of the platform 207$^x$, and in close proximity to the canvas, a pipe or tube 263, the front end of which is sustained by a bracket 264 and the rear end by a bracket 266 over which and over guide sheaves 267 on the body frame, the adjusting cable 268 passes (see Figs. 3$^D$, 40 and 41). The pipe 263 is longitudinally slotted as at 269 to permit passage of the screw 270 that fastens the slide bar 271 to the shiftable plug 272 that operates in the pipe and to which the cable 268 is fastened at 273. The plug 272 is pushed forward by a coil spring 274 within the pipe, against the tension of which spring the cable 268 acts.

The slide bar 271 is also supported by a collar 275 which slides on the pipe 263 (see Figs. 40—41) and it has one or more ears 276 into which the grain head straps 262 are hooked as at 277.

The cable 268 runs to the operating mechanism which is located on the operator's platform 207$^x$ at the rear thereof near the operator's seat 470 so as to be conveniently within his reach. This operating mechanism comprises a grooved wheel 278 on which the cable 268 may be wound to move the grain head straps rearwardly. The wheel 278 is mounted with its spindle 279 in bearings in a standard 280 and it has a back check ratchet 281 with which the holding pawl 282 engages, (see Figs. 3$^B$ and 17). The cable is wound up by turning the wheel 278 by a crank 283 and the pawl 282 is lifted to release the wheel by means of a treadle 284 having a rod 286 that engages the pawl, the treadle being pivoted at 285 (see Fig. 17) and a spring 287 being provided, if desired, to raise the treadle and maintain the normal engagement between the pawl 282 and the ratchet 281. The grain when cut falls on the canvas or conveyer, the heads of the grain ordinarily running faster than the butt, and the cut off end of the grain is retarded by engagement with the cut grain, thus giving the grain head the chance to run faster than the cut off end of the grain, consequently the grain heads have a tendency to go up the elevator too fast and in order to overcome this difficulty I provide the grain head straps which may be adjusted at any position desired along the platform, depending upon the length of the grain cut. The grain head straps serve to hold the grain heads from running too fast, and the knobs on the platform canvas help to carry the cut end of the grain along at proper speed to the elevating conveyer. Thus a more even feeding of the grain to the elevating conveyer is attained, it being understood that when short grain is being cut the grain head strap or straps are moved nearer the front end of the platform than when long grain is cut.

288 is a wind break which is detachably secured, (in any well-known way) at the rear of the platform.

289 is the inside grain divided fender or plate which is fastened to the body frame of the front of the inner side of the platform and is braced at 290 (see Figs. 1$^B$ and 3$^C$). The outer grain fender or divider 291 is secured at 292 to the front end of the bar 51 and is braced by a rod 293 to the fingers 297 of the cutting mechanism. The fender 291 is also supported at 294 and 295 (see Fig. 3$^C$) and it carries a rod 296 that projects between the side of the caster wheel 55 to keep the grain away from the caster wheel.

Each cutting mechanism finger has a base 298 that extends to each side and is fastened to the bottom bar 299 (see Fig. 3$^C$) the bases 298 having recesses 300 in their top faces (see Fig. 50) to reduce area in contact with the knife bar 301 to which the knives 302 are fastened. Knife guards 303 are secured to the front slideboard 304 of the platform conveyer and embrace the knives and knife bar between adjacent fingers 297, thus enabling the cutting mechanism to be located close up to the platform canvas and thereby leave the grain butts projecting only slightly over the platform edge after the grain is cut.

As heretofore stated, one of the features of my present invention is a self-adjusting elevator for conveying the grain from the platform past the binder (not shown) and discharging it through the spokeless wheel. The construction of the elevator is best shown in Figs. 3$^C$, 4$^B$ and 6, by reference to which it will be seen that two sideboards 305 are provided and secured to the body frame. They extend upwardly from the grain platform at about an angle of 45° and terminate about in the mid-vertical longitudinal plane of the spokeless wheel. The sideboards 305 are connected together at the top by a bridgeboard 306.

The elevator proper includes two belt conveyers, one 307 of which is fixed as to location while the other 308 is adjustably mounted (see Figs. 4$^A$ and 4$^B$). At the lower end, the belt 307 passes around a roller 309 suitably journaled in the sideboards, the space between the roller 309 and the grain platform conveyer being closed by a bridge bar 310 (see Fig. 4$^B$).

311 represents the upper roller of the lower elevator belt and from which the belt is driven. The roller 311 (see Fig. 4^A) has its shaft ends 312 suitably journaled in bearings in the sideboards (see Figs. 2^A and 2^B). The shaft 212 (and consequently the roller 311) is driven by a sprocket 313 around which the main drive chain 195 passes. The upper conveyer of the elevator has the shaft 314 of the upper or driver roller 315 journaled in vertically slidable bearing blocks 316 which are held in the slideways 318 in the sideboards 305 (see Figs. 4^A and 22), the blocks 316 being held down by yielding springs 317, the tension of which may be adjusted by screws 319 operating on blocks 320 above the springs. As best shown in Fig. 22, it will be seen that 321 is a plate having a slot 322 through which the fastening screw 323 passes to shiftably hold the plate on the sideboard 305. The plate 321 has studs 324 on which intermeshing pinions 325 are mounted, the studs being linked up with the respective shafts 312—314 by links 326 so as to hold the pinions 324 in mesh with gears 327—328 as the shafts 312—314 are separated or come closer together in regulation.

In order to allow the upper belt to travel faster than the lower belt, when urged by the grain, or in other words,—(to allow such belt to slip) I mount the gear 328 loosely on the shaft 314 and provide it with a ratchet face 329 to be engaged with the pawls 332 that are journaled at 331 in sockets on the disk 330 which is fixed to the shaft 314. The pawls 332 are engaged by springs 334 held in sockets 333 on the disk 330 (see Figs. 23 and 24).

In order to effect a more even elevation of the grain, I provide a chain finger supplemental elevator section to assist in raising the grain butts. This comprises a sprocket on the shafts 309—312 at the entrance side of the machine around which a chain 335 composed of links, some of which have fingers 336 (see Figs. 5, 33 and 34) passes. The chain is kept taut by an adjustable tension device 337 (see Fig. 5).

In practice, the finger 336 prevents the lagging of the grain butts while passing off the elevator and keeps the grain straight. The lower roller 339 of the upper elevator conveyer has its shaft 340 journaled in bearings in the swinging frame 341 which is hung on the shaft 314 (see Figs. 4^A and 4^B). The lower end of the frame 341 is yieldingly supported at each side from the sideboards by devices best shown in Figs. 3^C, 4^B, 5, 6, 30 and 31. At the front end there is a stud 342 (see Fig. 3^C to which the lower end 343 of the bolt 344 is pivoted. The bolt 344 passes through a bracket 345 and carries a tension spring 346 and an adjusting nut 347, as shown. At the rear end a bracket 348 is fastened to the sideboard 305 and on which a rock bearing 349 is carried. 350 is a bolt slidable in a bearing 349 (see Figs. 30 and 31) and the bolt is pivoted at 351 to the stud 352 on the arm 353 that projects from a plate 354, the plate being fastened to the side bar of the frame 341. The arm 353 has a portion 355 that extends through the slot 356 in the sideboard 305 and engages the same (see Fig. 31) to hold the frame 341 close to the sideboard. Thus, it will be observed, as grain enters between the upper and lower conveyers they will separate or come together to adjust themselves to the quantity of grain being delivered to the elevator from the grain platform and thereby prevent choking of the platform conveyer or of the elevator.

In order to move the machine over the ground to effect the harvesting function, I have provided two means, one a motor-driven mechanism and the other a horse draft appliance. As the motor-driven form of my harvester is the one preferred by me, I shall describe it first. This consists essentially of a trailer truck, an axle frame connecting the truck to the body frame and power transmission mechanism for operating the trailer truck, the spokeless wheel and the harvesting machinery carried thereby.

As the prime mover, I provide an internal combustion engine 356 which may be located at any convenient place, for instance, as diagrammed in dot and dash lines on Fig. 6. The engine may have its shaft 357 provided with a sprocket 358 over which the power transmission chain 359 passes. The chain 359 passes over guide pulleys 360 carried loose on the extended end of the shaft 192. The chain also passes around sprocket 141 (or in case of the horse drawn machine, the chain 359 passes around the sprocket 165 and in that construction a smaller engine is used than is necessary in the motor driven form of the invention).

An engine of any approved construction may be employed, and as I make no claim to the engine structure, a further discussion thereof is thought to be unnecessary.

The auxiliary frame includes longitudinal beams 364 which are braced together at 365, are pivoted at the front ends to the pivot bolt 35, and pass through slotted hangers 366, see Figs. 2^C, 4^B and 6). The frame is adjusted on the ends of the bolt 35 for leveling purposes by a lever operative device consisting of a bar 370 pivoted at 369 in a bridge plate 367 which is secured at 368 to one of the beams 364 (see Figs. 34 and 35). The bar 370 extends up a convenient distance and is pivoted at 371 to the lever 372. A rack segment 373 is fastened to the bar 370 and is designed to be engaged by the latch 374 to hold the lever rigidly with respect to the bar 370. A rod 376 is pivoted at 375 to one end of the lever 372 and is connected to a bracket 377 that extends from the lower body frame bar 43.

The bar 370 is supported in a bracket 305ˣ (see Figs. 1ᶜ and 4ᴬ) which bracket is slotted to permit passage of the lever and the lever 372 may be bent upwardly if desired so as not to interfere with the operation of other levers, as will be clear to those skilled in the art.

The beams 364 extend rearwardly and are fastened to the trailer truck 378 (see Fig. 1ᴱ) the frame having a hinge joint composed of two elements 379 fastened to the rear ends of the angle bars 364 of the auxiliary frame and two elements 380 secured to the bar extensions 381 and pivoted together at 382 (see Figs. 1ᴱ and 7). Each hinge element includes a pendent arm 383 which arms are transversely connected in pairs by spindle bolts 384 on which are sheaves 385 and spacing collars 386 (see Figs. 7 and 9). The cable 70 from the drum sector 67 (see Fig. 2ᶜ) passes around the sheaves 385 and has its end fastened at 287 to one of the collars 386 (see Figs. 7 and 9). The rear bar extensions 381 carry bridge members 388 with bearings 389 for the stub shaft 390 which connects, through a universal joint 391, with the telescoping end 392 of the trailer shaft 156, the shaft 156 having a second universal joint 393, if desired, adjacent to the body frame (see Fig. 1ᶜ).

By reference to Figs. 7 to 14 inclusive the construction of the trailer or steering truck will be best understood. The bars 381 are bolted to the upper turntable member 394 whose hub 395 turns on the hub 396 of the lower turntable member 397, the latter being fixed to the wheel yoke 414 and having a retaining flange 398 with which the holding clip 399 (see Fig. 11) on the upper turntable member 394 engages. The table members 394 and 397 have bearing bead surfaces 400.

401 is the sleeve of the driving gear 407, the sleeve having recesses 402 (see Figs. 10, 11 and 13) to receive the keys 403 on the hub 404 of the driving gear 405, the latter continuously meshing with the driving gear 406.

408 is the pivot spindle which is immovably held by a sleeve 409 (that is held secured by a bolt 410) and a bracket 411, the latter being fastened to one of the bars 381, and by a bracket 413 and collar 412, the latter being pinned to the spindle 408 at its lower end (see Figs. 10 and 11).

415 designates a pair of pendent brackets secured beneath the turntable plate 397 and having bearings 416 for the countershaft 417 whose bevel gear 418 meshes with the bevel gear 407 and which carries a sprocket 419. The brackets 415 include lower arms joined together by a cross bar 420 to which at 422, the clutch levers 421 are pivoted.

Guide rollers 423 are provided in a bracket 424 on the rear of the lower turntable member 397, over which the connecting loop 425 passes, the ends of the loop being fastened at 426 to the upper ends of the respective arms 421.

The loop 425 joins to the clutch releasing cable 440 and passes over a roller 427 on the rear extension of the member 397 (see Figs. 7, 8 and 11).

428 is another guide sheave over which the guide 440 passes and 429 are other guide rollers for the cable 440, the rollers 429 being supported by arms 430 extending from the sleeve 409 (see Figs. 7, 8 and 12). The traction wheels 433 are loose on a shaft 431 which (see Fig. 8) is journaled in bearings 432 in the yoke frame 414. The wheel hubs have clutch faces 434 to be engaged by clutches 435—437 which have pin and slot connections 436 with the shaft 431. The clutch member 437 has a driving sprocket 438 around which and around the sprocket 419 the chain 439 is passed.

The shaft 431 has stepped ends 431ˣ on which the wheels 433 are journaled, the reduced ends 431ˣ forming, in connection with the intermediate portion of the shaft, shoulders against which the wheels 433 bear to hold them spaced apart and a coil spring 421ˣ draws the levers 421 together to release the wheel clutches when the cable 440 is slackened.

The cable 440 extends to the operator's platform where it connects with a lever 441 that is fulcrumed at 442 and has a latch 443 to engage the rack 444.

445 is a grooved wheel fastened to the spindle 408 and to which the steering cable 446 is secured by an eye bolt 363 (see Fig. 11) the member 446 extending to the steering wheel drum 447 (see Figs. 16 and 17) to which the cable ends are fastened.

448 is a frame on the rear of the operator's platform, which has a lower slideway 449 for the slide 450 that forms the lower or step bearing for the steering post 451. The drum 447 is secured to turn with the post and the slide is yieldingly held by a spring 452 secured to it at 453 and secured at 454 to the platform (see Fig. 1ᴮ); the spring taking up slack in the steering cables. The post 451 is also held in a trunnion bearing 455.

A hand wheel 456 is provided for setting purposes and in order to hold the post 451 from turning, when desired, a sleeve 457 is placed on the shaft and fastened at 458 to lugs 460 from the trunnion bearing 455 by a clamp 459, (see Figs. 17 to 21).

At the upper end, the sleeve 457 carries a plate 461 having a roughened surface portion 462.

463 is a bracket secured to the steering wheel 456, (see Fig. 18), and having a lug 464 to which the cam lever 465 is fulcrumed. The bracket also has a bearing 466 in the pin 467; the lower end passing through a guide bracket 468 pinned to the post 451 (see Fig. 20) and adapted to be moved to engage the surface 462 by the lever 465 against the resistance of a spring 469 (see Fig. 18). 470 is the operator's seat which is supported on a standard 471.

When it is desired to use horse draft, the attachments shown in Figs. 52 *et seq.* are employed in lieu of the trailer mechanism shown in Fig. 1ᴱ and by reference to Figs. 52 *et seq.* it will be seen that the yoke corresponding to the yoke 71 is modified to sustain the draft tongue 477. In this form, the bar 472 of the yoke is hinged at 473 to the frame bar 43 and has its front end secured to the tongue 477 which lies on the inward or grain side of the spokeless wheel 1 and is fastened to a socket 475 that is hinged at 476 to the frame bar 43, another angle bar 474 being secured to the grain side of the tongue to coöperate with the angle bar 472 in forming a slideway for the members 72.

A truck whose frame is composed of sides 478 joined by front and back cross bars 497 includes axles 480 for the flanged wheels 481 which run on the tread section 4 of the side flanges 2 of the spokeless wheel 1. The wheels 481 are held against movement on the axle by the sides 478 and by collars 483 that are secured on the axles by set screws 484, the axles being held in place by cotter pins 482.

485 is a mid-cross rod carried by the frame sides 478, on which the swivel sleeves 486 are held by pins 487, the sleeves 486 having ears 495 for the draft yoke 496.

488 is a sleeve on the rod 485 which swivels on the rod and is held from axial movement by pins 489, the sleeve 488 having a projection 490 to which the brace rod 491 is fastened. The rod 491 is also hinged at 492 to the front frame bar 43.

493 is a swivelly mounted sheave over which the draft cable 497 passes, the sheave being mounted at 494 on the yoke angle bar 472 in about the mid-plane of the wheel 1.

The tongue 477 is provided with a T-guide 498 on which the slide 499 is mounted, the slide 499 having a bolt 501 that carries a sheave 500 and passes through one of the eyes of the double tree bar plate 502, the latter projecting over the double tree bar 503 and being fastened by the outer bolt thereof, as will be clear by reference to Figs. 52, 53.

The cable 497 passes from the yoke 496 through the block of the sheave 493, thence out the sheave 500 and has its end fastened to a part of the main frame of the machine by an adjustable anchor plate 504.

In order that the tongue may be raised and lowered on the pivotal axis 473—476 I provide a lever 505, rack 507 and holding latch 508, the lever being pivoted at 506 to a suitable relatively fixed part of the main structure, as for instance, to the front sideboard 305 of the conveyer, and projecting to a position for convenient operation. The lever 505 is linked at 509 with the tongue and by moving the lever, the tongue may be raised or lowered, as will be clearly understood, by reference to the drawings.

The fastening point for the anchor plate 504 is so adjusted that when the draft pulley is applied to the slide 499 through the double tree there will be no tendency for the machine to be pulled out of the straightway path.

When horse power is used, I have, of course, dispensed with the powerful driving internal combustion engine, and if desired an engine of lesser power may be used simply for the purpose of driving the reel operating mechanism and the cutting mechanism and such engine may be connected up in the usual way with the sprocket 165 for driving purposes and the engine may be suitably located and supported on the machine in any desired manner. In that event, the shafts 83—84 and their coöperating parts may be removed. If they are removed I substitute guide members to engage the central runway of the spokeless wheel to set the upper part of the same. These guide members are best shown in Figs. 53—54 and 55, by reference to which it will be seen that I provide a bracket 510 securable to the sideboards 505 and carrying a tubular member 511 of angular cross section, the outer end of which member is provided with a collar 512 and set screw 513 to secure the inner angular bar 514 in positions of longitudinal adjustment, the bar 514 telescoping within the tube 511. 515 is a double bearing bracket which is fastened at 516 to the bar 514 and has a bearing 517 for the bolt 518 to which the flanged wheel 519 is securely pinned, the wheel 519 running on the flange 7 of the wheel 1, the flange 7 being also guided by another flange guide roller 520 which is held on the projecting end of the rod 514 by a suitable set screw 521.

The collar 512 has an ear 522 to which the brace rods 103 or 90, as the case may be, are adapted to be fastened.

While my complete invention embodies several distinct subjects matter of improvement on the machine as a whole and while in this application I have disclosed those specific improvements in the grain head strap and allied parts of the grain platform, the reel operating mechanism, the cutting apparatus, the special elevating conveyer construction and the horse drawn modifications, yet I desire it understood that in this application I make no claim, *per se,* to the head strap and the aforesaid special mechanism as they form the subject matter of the following divisional applications to wit: 1st: application embodying the improvements in the grain head strap and allied parts of the grain platform structure, filed on the 10th day of June, 1916, Serial No. 102856; 2nd: application on the reel operating mechanism filed on the 10th day of June 1916, Serial No. 102857; 3rd: application for the cutting apparatus, filed on the 10th day of June, 1916, Serial No. 102858; 4th: application for the special conveyer structure, filed on the 10th day of June, 1916, Serial No. 102859; 5th: application on the horse draft modification, filed on the 10th day of June, Serial No. 102860.

From the foregoing description taken in connection with the accompanying drawings, it is thought the complete construction, operation and advantages of my invention will be readily understood by those skilled in the art.

What I claim is:—

1. In a harvester, a spokeless wheel having an internal runway, a body frame on which the harvesting machinery is located, a supporting wheel for said frame running in said runway, a caster wheel for supporting the grain side of said frame, a trailing truck and an articulated connection between said truck and said frame, and mechanism coöperative with said frame, said supports and said truck connection for raising, lowering and leveling the frame with respect to the ground.

2. In a harvester, a spokeless tractor wheel having an internal runway, a body frame on which the harvesting machinery is located, a supporting wheel for said frame running in said runway, a caster wheel for supporting the grain side of said frame, a third ground support for said frame, mechanism coöperative with said frame and said supports for raising and lowering the frame with respect to the ground, said spokeless wheel having a gear flange, driving mechanism mounted on the frame and including driving gears engaging said flange, and means for operating said gears.

3. In a harvester, a spokeless tractor wheel having an internal runway, a body frame on which the harvesting machinery is located, a supporting wheel for said frame running in said runway, a caster wheel for supporting the grain side of said frame, a third ground support for said frame, mechanism coöperative with said frame and said supports for raising and lowering the frame with respect to the ground, said spokeless wheel having a gear flange, driving mechanism mounted on the frame and including driving gears engaging said flange and means for operating said gears, said gear operating means including reversing mechanism.

4. In a harvester, a spokeless tractor wheel having an internal runway, a body frame on which the harvesting machinery is located, a supporting wheel for said frame running in said runway, a caster wheel for supporting the grain side of said frame, a third ground support for said frame, mechanism coöperative with said frame and said supports for raising and lowering the frame with respect to the ground, said spokeless wheel having a gear flange, driving mechanism mounted on the frame and including driving gears engaging said flange, means for operating said gears, means for mounting said gears to yield as to position with relation to the center of said spokeless wheel for purpose of self-adjustment as said frame is raised or lowered.

5. In a harvester, a spokeless tractor wheel having an internal runway, a body frame on which the harvesting machinery is located, a supporting wheel for said frame running in said runway, a caster wheel for supporting the grain side of said frame, a third ground wheel support for said frame, mechanism coöperative with said frame and said supports for raising and lowering the frame with respect to the ground, said spokeless wheel having a gear flange, driving mechanism mounted on the frame and including driving gears engaging said flange, means for operating said gears, said gear operating means including reversing mechanism, means for mounting said gears to yield as to position with relation to the center of said spokeless wheel for purpose of self-adjustment as said frame is raised or lowered.

6. In a harvester, a spokeless tractor wheel having an internal runway, a body frame on which the harvesting machinery is located, a supporting wheel for said frame running in said runway, a caster wheel for supporting the grain side of said frame, a third ground support for said frame, mechanism coöperative with said frame and said supports for raising and lowering the frame with respect to the ground, said third support comprising a trailing truck and a frame joining said truck with said body frame, power transmission elements for driving said trailing truck and including a propeller shaft extending from the body frame to the truck, driving elements on the body frame for operating said propeller shaft, and means on the body frame connected with said truck for turning said truck on a vertical axis for steering purposes.

7. In a harvester, a spokeless tractor wheel having an internal runway, a body frame on which the harvesting machinery is located, a supporting wheel for said frame running in said runway, a caster wheel for supporting the grain side of said frame, a third ground support for said frame, mechanism coöperative with said frame and said supports for raising and lowering the frame with respect to the ground, said third support comprising a trailing truck and a frame joining said truck with said body frame, power transmission elements for driving said trailing truck and including a propeller shaft extending from the body frame to the truck, driving elements on the body frame for operating said propeller shaft, means on the body frame connected with said truck for turning said truck on a vertical axis for steering purposes, and driving mechanism coöperative with said spokeless wheel for propelling the same.

8. In a harvester, a spokeless wheel, a body frame which includes a platform frame section, and on which frame the harvester mechanism is designed to be located, said spokeless wheel having a runway, a body frame supporting wheel located in said runway, said body frame projecting from one side of said spokeless wheel, a caster wheel on the projected side of said frame, guy pinions engaging said spokeless wheel, means for yieldingly mounting said pinions on said frame, a power shaft and a driving pinion thereon to engage said spokeless wheel, means on said frame to support said power shaft, and mechanism coöperating with said body frame supporting runway wheel and with said caster wheel for raising and lowering said frame.

9. In a harvester, a spokeless wheel, a body frame which includes a platform frame section, and on which frame the harvester mechanism is designed to be located, said spokeless wheel having a runway, a body frame supporting wheel located in said runway, said body frame projecting from one side of said spokeless wheel, a caster wheel on the projected side of said frame, guy pinions engaging said spokeless wheel, means for yieldingly mounting said pinions on said frame, a power shaft and a driving pinion thereon to engage said spokeless wheel, means on said frame to yieldingly support said power shaft, and mechanism coöperating with the said body frame supporting runway wheel, and with said caster wheel for raising and lowering said frame.

10. In a harvester, a spokeless wheel, a body frame which includes a platform frame section, and on which frame the harvester mechanism is designed to be located, said spokeless wheel having a runway, a body frame supporting wheel located in said runway, said body frame projecting from one side of said spokeless wheel, a caster wheel on the projected side of said frame, guy pinions engaging said spokeless wheel, means for yieldingly mounting said pinions on said frame, a power shaft and a driving pinion thereon to engage said spokeless wheel, means on said frame to support said power shaft, mechanism coöperating with said body frame supporting runway wheel and with said caster wheel for raising and lowering said frame, a steering frame pivoted to said body frame, and a connection between said frames for adjusting their relation for leveling purposes.

11. In a harvester, a spokeless wheel, a body frame which includes a platform frame section, and on which frame the harvester mechanism is designed to be located, said spokeless wheel having a runway, a body frame supporting wheel located in said runway, said body frame projecting from one side of said spokeless wheel, a caster wheel on the projected side of said frame, guy pinions engaging said spokeless wheel, means for yieldingly mounting said pinions on said frame, a power shaft and a driving pinion thereon to engage said spokeless wheel, means on said frame to support said power shaft, mechanism coöperating with said body frame supporting runway wheel and with said caster wheel for raising and lowering said frame, a steering frame pivoted to said body frame, a connection between said frame for adjusting their relation for leveling purposes, said last named means comprising a lever connected with both frames, and a rack segment and pawl latch device to hold the lever in its positions of adjustment.

12. In a harvester, a spokeless wheel, a body frame which includes a platform frame section, and on which frame the harvester mechanism is designed to be located, said spokeless wheel having a runway, a body frame supporting wheel located in said runway, said body frame projecting from one side of said spokeless wheel, a caster wheel on the projected side of said frame, guy pinions engaging said spokeless wheel, means for yieldingly mounting said pinions on said frame, a power shaft and a driving pinion thereon to engage said spokeless wheel, means on said frame to support said power shaft, mechanism coöperating with said body frame supporting runway wheel and with said caster wheel for raising and lowering said frame, a steering frame pivoted to said body frame, a connection between said frames for adjusting their relation for leveling purposes, said steering frame including a trailer truck and a connection between the truck and the body frame.

13. In a harvester, a spokeless wheel, a body frame which includes a platform frame section, and on which frame the harvester mechanism is designed to be located, said spokeless wheel having a runway, a body frame supporting wheel located in said runway, said body frame projecting from one side of said spokeless wheel, a caster wheel on the projected side of said frame, guy pinions engaging said spokeless wheel, means for yieldingly mounting said pinions on said frame, a power shaft and a driving pinion thereon to engage said spokeless wheel, means on said frame to support said power shaft, mechanism coöperating with said body frame supporting runway wheel and with said caster wheel for raising and lowering said frame, a steering frame pivoted to said body frame, a connection between said frames for adjusting their relation for leveling purposes, said last named means comprising a lever connected with both frames, a rack segment and pawl latch device to hold the lever in its positions of adjustment, said steering frame including a trailer truck and a connection between the truck and the body frame.

14. In a harvester, a spokeless wheel, a body frame which includes a platform section, and on which frame the harvester mechanism is designed to be located, said spokeless wheel having a runway, a body frame supporting wheel located in said runway, said body frame projecting from one side of said spokeless wheel, a caster wheel on the projected side of said frame, guy pinions engaging said spokeless wheel, means for yieldingly mounting said pinions on said frame, a power shaft and a driving pinion thereon to engage said spokeless wheel, means on said frame to support said power shaft, mechanism coöperating with said body frame supporting runway wheel and with said caster wheel for raising and lowering said frame, a steering frame pivoted to said body frame, a connection between said frames for adjusting their relation for leveling purposes, said steering frame including a trailer truck and a connection between the truck and the body frame, said connection comprising two members hinged together on a horizontal axis.

15. In a harvester, a spokeless wheel, a body frame which includes a platform frame section, and on which frame the harvester mechanism is designed to be located, said spokeless wheel having a runway, a body frame supporting wheel located in said runway, said body frame projecting from one side of said spokeless wheel, a caster wheel on the projected side of said frame, guy pinions engaging said spokeless wheel, means for yieldingly mounting said pinions on said frame, a power shaft and a driving pinion thereon to engage said spokeless wheel, means on said frame to support said power shaft, mechanism coöperating with said body frame supporting runway wheel and with said caster wheel for raising and lowering said frame, a steering frame pivoted to said body frame, a connection between said frames for adjusting their relation for leveling purpose, said last named means comprising a lever connected with both frames, a rack segment and pawl latch device to hold the lever in its positions of adjustment, said steering frame including a trailer truck and a connection between the truck and the body frame, said connection comprising two members hinged together on a horizontal axis.

16. In a harvester, a spokeless wheel, a body frame which includes a platform section, and on which frame the harvester mechanism is designed to be located, said spokeless wheel having a runway, a body frame supporting wheel located in said runway, said body frame projecting from one side of said spokeless wheel, a caster wheel on the projected side of said frame, guy pinions engaging said spokeless wheel, means for yieldingly mounting said pinions on said frame, a power shaft and a driving pinion thereon to engage said spokeless wheel, means on said frame to support said power shaft, mechanism coöperating with said body frame supporting runway wheel and with said caster wheel for raising and lowering said frame, a steering frame pivoted to said body frame, a connection between said frames for adjusting their relation for leveling purposes, said steering frame including a trailer truck and a connection between the truck and the body frame, said connection comprising two members hinged together on a horizontal axis, one of said members being pivoted to said body frame on a parallel horizontal axis, and mechanism coöperative with said body frame raising and lowering mechanism for harmoniously moving said two members on their hinged axis.

17. In a harvester, a spokeless wheel, a body frame which includes a platform frame section, and on which frame the harvester mechanism is designed to be located, said spokeless wheel having a runway, a body frame supporting wheel located in said runway, said body frame projecting from one side of said spokeless wheel, a caster wheel on the projected side of said frame, guy pinions engaging said spokeless wheel, means for yieldingly mounting said pinions on said frame, a power shaft and a driving pinion thereon to engage said spokeless wheel, means on the said frame to support said power shaft, mechanism coöperating with said body frame supporting runway wheel and with said caster wheel for raising and lowering said frame, a steering frame pivoted to said body frame, a connection between said frames for adjusting their relation for leveling purposes, said last named means comprising a lever connected with both frames, a rack segment and pawl latch device to hold the lever in its positions of adjustment, said steering frame including a trailer truck and a connection between the truck and the body frame, said connection comprising two members hinged together on a horizontal axis, one of said members being pivoted to said body frame on a parallel horizontal axis, and mechanism coöperative with said body frame raising and lowering mechanism for harmoniously moving said two members on their hinge axis.

18. In a harvester, a spokeless tractor wheel having a central web terminating in an annular flange to form a guyway, said wheel including annular runways on each side of said web; a body frame which includes a platform extending to one side of said wheel; means for sustaining said body frame, said means comprising supporting wheels located in said runways, a shiftable connection between said supporting wheels and said frame, guy rollers engaging said guyway, means for supporting said guy rollers on said frame, a supporting wheel on the outer side of said frame, a shiftable connection between said frame and said last named wheel and means coöperative with said supporting wheel connections for raising and lowering said frame.

19. In a harvester, a spokeless tractor wheel having a central web terminating in an annular flange to form a guyway, said wheel including annular runways on each side of said web; a body frame which includes a platform extending to one side of said wheel; means for sustaining said body frame, said means comprising supporting wheels located in said runways, a shiftable connection between said supporting wheels and said frame, guy rollers engaging said guyway, means for supporting said guy rollers on said frame, a supporting wheel on the outer side of said frame, a shiftable connection between said frame and said last named wheel and pulley and cable devices coöperative with said supporting wheel connections for raising and lowering said frame.

20. In a harvester, a spokeless tractor wheel having a central web terminating in an annular flange to form a guyway, said wheel including annular runways on each side of said web, a body frame which includes a platform extending to one side of said wheel; means for sustaining said body frame, said means comprising supporting wheels located in said runways, a shiftable connection between said supporting wheels and said frame, guy rollers engaging said guyways, means for supporting said guy rollers on said frame, a supporting wheel on the outer side of said frame, a shiftable connection between said frame and said last named wheel, means coöperative with said supporting wheel connections for raising and lowering said frame; and mechanism coöperative with said guy rollers and said body frame for maintaining the engagement between said spokeless wheel guyway and said guy rollers as said frame is raised and lowered.

21. In a harvester, a spokeless tractor wheel having a central web terminating in an annular flange to form a guyway, said wheel including annular runways on each side of said web; a body frame which includes a platform extending to one side of said wheel; means for sustaining said body frame, said means comprising supporting wheels located in said runways, a shiftable connection between said supporting wheels and said frame guy rollers engaging said guyway, means for supporting said guy rollers on said frame, a supporting wheel on the outer side of said frame, a shiftable connection between said frame and said last named wheel, pulley and cable devices coöperative with said supporting wheel connections for raising and lowering said frame; and mechanism coöperative with said guy rollers and said body frame for maintaining the engagement between said spokeless wheel guyway and said guy rollers as said frame is raised and lowered.

22. In a harvester, a spokeless tractor wheel having a central web terminating in an annular flange to form a guyway, said wheel including annular runways on each side of said web; a body frame which includes a platform extending to one side of said wheel; means for sustaining said body frame, said means comprising supporting wheels located in said runways, a shiftable connection between said supporting wheels and said frame, guy rollers engaging said guyways, means for supporting said guy rollers on said frame, a supporting wheel on the outer side of said frame, a shiftable connection between said frame and said last named wheel, means coöperative with said supporting wheel connections for raising and lowering said frame, said guy roller supporting means comprising telescoping members.

23. In a harvester, a spokeless tractor wheel having a central web terminating in an annular flange to form a guyway, said wheel including annular runways on each side of said web; a body frame which includes a platform extending to one side of said wheel; means for sustaining said body frame, said means comprising supporting wheels located in said runways, a shiftable connection between said supporting wheels and said frame, guy rollers engaging said guyway, means for supporting said guy rollers on said frame, a supporting wheel on the outer side of said frame, a shiftable connection between said frame and said last named wheel, pulley and cable devices coöperative with said supporting wheel connections for raising and lowering said frame, said guy roller supporting means comprising telescoping members.

24. In a harvester, a body frame, a supporting wheel on one side of said frame, a caster wheel on the opposite side of said frame, shiftable elements connecting said wheels with said frame; an auxiliary frame pivoted to said body frame and adapted to be raised and lowered; a third element of support to which said auxiliary frame is fastened, and mechanism coöperative with said shiftable elements and with said auxiliary frame for raising and lowering said body frame.

25. In a harvester, a body frame, a supporting wheel on one side of said frame, a caster wheel on the opposite side of said frame; shiftable elements connecting said wheels with said frame; an articulated auxiliary frame pivoted to said body frame and adapted to be raised and lowered; a third element of support to which said auxiliary frame is fastened; and drum and cable devices for moving said shiftable elements to raise and lower said body frame.

26. In a harvester, a body frame, a supporting wheel on one side of said frame, a caster wheel on the opposite side of said frame; shiftable elements connecting said wheels with said frame; an articulated auxiliary frame pivoted to said body frame and adapted to be raised and lowered; a third element of support to which said auxiliary frame is fastened; drum and cable devices for moving said shiftable elements to raise and lower said body frame, and means for moving said auxiliary frame simultaneously in its articulate joint.

27. In a harvester, a body frame, a supporting wheel on one side of said frame, a caster wheel on the opposite side of said frame; shiftable elements connecting said wheels with said frame; an articulated auxiliary frame pivoted to said body frame and adapted to be raised and lowered; a third element of support to which said auxiliary frame is fastened; drum and cable devices for moving said shiftable elements to raise and lower said body frame, and a lever device connecting said frames for adjusting said auxiliary frame with respect to said body frame.

28. In a harvester, the combination with the body frame, a main drive shaft having a sprocket, a platform conveyer having a drive shaft and sprocket, a cutting mechanism including a cutting mechanism operating shaft having a driving sprocket, a reel driving shaft having a sprocket, a power transmitting connection between said reel and said reel driving shaft, an elevator having a driving sprocket, and a common drive chain taking over all of said sprockets whereby all of said parts will be driven in unison.

29. In a harvester, the combination with the body frame, a main drive shaft having a sprocket, a platform conveyer having a drive shaft and sprocket, a cutting mechanism including a cutting mechanism operating shaft having a driving sprocket, a reel driving shaft having a sprocket, a power transmission connection between said reel and said reel driving shaft, an elevator having a driving sprocket, a common drive chain taking over all of said sprockets, said power transmitting element including mechanism whereby the speed of the reel may be changed while the other aforementioned parts are in full operation.

30. In a harvester, the combination with the body frame, a main drive shaft having a sprocket, a platform conveyer having a drive shaft and sprocket, a cutting mechanism including a cutting mechanism operating shaft having a driving sprocket, a reel driving shaft having a sprocket, a power transmitting connection between said reel and said reel driving shaft, an elevator having a driving sprocket, a common drive chain taking over all of said sprockets, grain head straps held over the platform conveyer and means under control of the operator for shifting said straps while the machine is in operation and without effecting the operative movement of other operative parts of the machine.

31. In a harvester, a body frame, a supporting wheel at each side of the same, shiftable supports between said frame and said wheels through the medium of which said frame may be raised and lowered, a trailer truck, an auxiliary frame between said truck and said body frame, a pivotal connection between said frames, means coöperative with said wheel supports for raising and lowering said body frame, an adjustable connection for rigidly holding said body frame and said auxiliary frame from movement on the pivotal connection between them, power transmitting mechanism on said body frame and coöperative with one of said side wheels to propel the same.

32. In a harvester, a body frame, a supporting wheel at each side of the same, shiftable supports between said frame and said wheels through the medium of which said frame may be raised and lowered, a trailer truck, an auxiliary frame between said truck and said body frame, a pivotal connection between said frames, means coöperative with said wheel supports for raising and lowering said body frame, an adjustable connection for rigidly holding said body frame and said auxiliary frame from movement on the pivotal connection between them, power transmitting mechanism on said body frame and coöperative with one of said side wheels to propel the same, said trailer truck including traction wheels and a supporting yoke therefor, power transmitting mechanism from the body frame mechanism for driving said truck wheels.

33. In a harvester, a body frame, a supporting wheel at each side of the same, shiftable supports between said frame and said means coöperative with said wheel supports for raising and lowering said body frame, an adjustable connection for rigidly holding said body frame and said auxiliary frame from movement on the pivotal connection between them, power transmitting mechanism on said body frame and coöperative with one of said side wheels to propel the same, said trailer truck including traction wheels and a supporting yoke therefor, power transmitting mechanism from the body frame mechanism for driving said truck wheels, controlling elements manipulated from the body frame for operatively connecting and disconnecting said truck wheels from the power transmitting elements.

34. In a harvester, a body frame, a supporting wheel at each side of the same, shiftable supports between said frame and said wheels through the medium of which said frame may be raised and lowered, a trailer truck, an auxiliary frame between said truck and said body frame, a pivotal connection between said frames, means coöperative with said wheel supports for raising and lowering said body frame, an adjustable connection for rigidly holding said body frame and said auxiliary frame from movement on the pivotal connection between them, power transmitting mechanism on said body frame, said trailer truck including traction wheels and a supporting yoke therefor pivoted to turn on a vertical axis, steering mechanism controlled from the body frame and connected with said yoke for turning the same, power transmitting mechanism from the body frame mechanism for driving said truck wheels, controlling elements manipulated from the body frame for operatively connecting and disconnecting said truck wheels from the power transmitting elements.

35. In a harvester, a body frame, a supporting wheel at each side of the same, shiftable supports between said frame and said wheel through the medium of which said frame may be raised and lowered, a trailer truck, an auxiliary frame between said truck and said body frame, a pivotal connection between said frames, means coöperative with said wheel supports for raising and lowering said body frame, an adjustable connection for rigidly holding said body frame and said auxiliary frame from movement on the pivotal connection between them, power transmitting mechanism on said frame, said trailer truck, including traction wheels and a supporting yoke therefor pivoted to turn on a vertical axis, steering mechanism controlled from the body frame and connected with said yoke for turning the same, power transmitting mechanism from the body frame mechanism for driving said truck wheels, controlling elements manipulated from the body frame for operatively connecting and disconnecting said truck wheels from the power transmitting elements, said steering mechanism comprising a steering post on the body frame having a steering wheel, drum and cable connections between said post and said truck yoke.

36. In a harvester, a body frame, a supporting wheel at each side of the same, shiftable supports between said frame and said wheels through the medium of which said frame may be raised and lowered, a trailer truck, an auxiliary frame between said truck and said body frame, a pivotal connection between said frames, means coöperative with said wheel supports for raising and lowering said body frame, an adjustable connection for rigidly holding said body frame and said auxiliary frame from movement on the pivotal connection between them, power transmitting mechanism on said body frame, said trailer truck including traction wheels and a supporting yoke therefor pivoted to turn on a vertical axis, steering mechanism controlled from the body frame and connected with said yoke for turning the same, power transmitting mechanism from the body frame mechanism for driving said truck wheels, controlling elements manipulated from the body frame for operatively connecting and disconnecting said truck wheels from the power transmitting elements, said steering mechanism comprising a steering post on the body frame having a steering wheel, drum and cable connections between said post and truck yoke, and means for yieldably supporting said post.

37. In a harvester, a body frame, a supporting wheel at each side of the same, shiftable supports between said frame and said wheels through the medium of which said frame may be raised and lowered, a trailer truck, an auxiliary frame between said truck and said body frame, a pivotal connection between said frames, means coöperative with said wheel supports for raising and lowering said body frame, an adjustable connection for rigidly holding said body frame and said auxiliary frame from movement on the pivotal connection between them, power transmitting mechanism on said body frame, said trailer truck including traction wheels and a supporting yoke therefor pivoted to turn on a vertical axis, steering mechanism controlled from the body frame and connected with said yoke for turning the same, power transmitting mechanism from the body frame mechanism for driving said truck wheels, controlling elements manipulated from the body frame for operatively connecting and disconnecting said truck wheels from the power transmitting elements, said steering mechanism comprising a steering post on the body frame having a steering wheel, drum and cable connections between said post and said truck yoke, and a locking device for holding said steering post against turning.

38. In a harvester, a body frame, a supporting wheel at each side of the same, shiftable supports between said frame and said wheels through the medium of which said frame may be raised and lowered, a trailer truck, an auxiliary frame between said truck and said body frame, a pivotal connection between said frames, means cooperative with said wheel supports for raising and lowering said body frame, an adjustable connection for rigidly holding said body frame and said auxiliary frame from movement on the pivotal connection between them, power transmitting mechanism on said body frame, said trailer truck including traction wheels and a supporting yoke therefor pivoted to turn on a vertical axis, steering mechanism controlled from the body frame and connected with said yoke for turning the same, power transmitting mechanism from the body frame mechanism for driving said truck wheels, controlling elements manipulated from the body frame for operatively connecting and disconnecting said truck wheels from the power transmitting elements, said steering mechanism comprising a steering post on the body frame having a steering wheel, drum and cable connections between said post and truck yoke, means for yieldably supporting said post and a locking device for holding said steering post against turning.

39. In a harvester, a body frame, a supporting wheel at each side of the same, shiftable supports between said frame and said wheels through the medium of which said frame may be raised and lowered, a trailer truck, an auxiliary frame between said truck and said body frame, a pivotal connection between said frames, means cooperative with said wheel supports for raising and lowering said body frame, an adjustable connection for rigidly holding said body frame and said auxiliary frame from movement on the pivotal connection between them, power transmitting mechanism on said body frame, said trailer truck including traction wheels and a supporting yoke therefrom pivoted to turn on a vertical axis, steering mechanism controlled from the body frame and connected with said yoke for turning the same, power transmitting mechanism from the body frame mechanism for driving said truck wheels, controlling elements manipulated from the body frame for operatively connecting and disconnecting said truck wheels from the power transmitting elements, said steering mechanism comprising a steering post on the body frame having a steering wheel, drum and cable connections between said post and said truck yoke, a locking device for holding said steering post against turning, said locking device comprising a fixed plate, a plunger mounted on said steering post and wheel, and a cam device to force said plunger against said plate and means for retracting said plunger when released.

40. In a harvester, a body frame, a supporting wheel at each side of the same, shiftable supports between said frame and said wheels through the medium of which said frame may be raised and lowered, a trailer truck, an auxiliary frame between said truck and said body frame, a pivotal connection between said frames, means cooperative with said wheel supports for raising and lowering said body frame, an adjustable connection for rigidly holding said body frame and said auxiliary frame from movement on the pivotal connection between the power transmitting mechanism on said body frame, said trailer truck including traction wheels and a supporting yoke therefor pivoted to turn on a vertical axis, steering mechanism controlled from the body frame and connected with said yoke for turning the same, power transmitting mechanism from the body frame mechanism for driving said truck wheels, controlling elements manipulated from the body frame for operatively connecting and disconnecting said truck wheels from the power transmitting elements, said steering mechanism comprising a steering post on the body frame having a steering wheel, drum and cable connections between said post and said truck yoke, means for yieldably supporting said post and a locking device for holding said steering post against turning, said locking device comprising a fixed plate, a plunger mounted on said steering post and wheel, and a cam device to force said plunger against said plate, and means for retracting said plunger when released.

41. In a harvester, a spokeless tractor wheel having an internal runway, a body frame on which the harvesting machinery is located, a supporting wheel for said frame running in said runway, a caster wheel for supporting the grain side of said frame, a third ground support for said frame, mechanism coöperative with said frame and said supports for raising and lowering the frame with respect to the ground, said third support comprising a trailing truck and a frame joining said truck with said body frame, power transmission elements for driving said trailing truck and including a propeller shaft extending from the body frame to the truck, driving elements on the body frame for operating said propeller shaft, means on the body frame connected with said truck for turning said truck on a vertical axis for steering purposes, said trailing truck comprising a yoke having bearings, a turntable connection between said yoke and said frame that joins the truck with the body frame, a shaft carried by said yoke frame, traction wheels loosely mounted on said shaft, clutch devices for clutching said traction wheels to said shaft, means for operating said clutching devices, a drive gear with which said propeller shaft is geared, and power transmitting connections between said truck gear and said shaft to turn the same.

42. In a harvester, a spokeless tractor wheel having an internal runway, a body frame on which the harvesting machinery is located, a supporting wheel for said frame running in said runway, a caster wheel for supporting the grain side of said frame, a third ground support for said frame, mechanism coöperative with said frame and said supports for raising and lowering the frame with respect to the ground, said spokeless wheel having a gear flange, driving mechanism mounted on the frame and including driving gears engaging said flange, means for operating said gears, said third ground support comprising a trailer truck and an auxiliary frame connecting said trailer truck with said body frame, said trailer truck comprising a yoke, a traction wheel shaft carried by said yoke, traction wheels on said shaft, a turntable connection between said yoke, and said auxiliary frame whereby said yoke may be turned on a vertical axis for steering purposes, means operated from the body frame for turning said yoke, power transmitting elements extended from said driving mechanism to said trailer truck and power transmitting connections on said trailer truck between the same and the trailer truck wheels, said connection including shiftable clutch devices and means on the body frame for operating said clutch devices.

43. In a harvester, a body frame, a supporting wheel at each side of the frame, a trailer truck, an auxiliary frame between said truck and said body frame, a pivotal connection between said frames, an adjustable connection for rigidly holding said body frame and said auxiliary frame from movement on the pivotal connection, and power transmitting mechanism on the body frame and coöperative with one of said side wheels to propel the machine.

44. In a harvester, a body frame, a supporting wheel at each side of the frame, a trailer truck, an auxiliary frame between said truck and said body frame, a pivotal connection between said frames, an adjustable connection for rigidly holding said body frame and said auxiliary frame from movement on the pivotal connection, power transmitting mechanism on the body frame and coöperative with one of said side wheels to propel the machine, said trailer truck including traction wheels and power transmitting mechanism from the body frame mechanism for driving said traction wheels.

45. In a harvester, a body frame, a supporting wheel at each side of the frame, a trailer truck, an auxiliary frame between said truck and said body frame, a pivotal connection between said frames, an adjustable connection for rigidly holding said body frame and said auxiliary frame from movement on the pivotal connection, power transmitting mechanism on the body frame and coöperative with one of said side wheels to propel the machine, said trailer truck including traction wheels and power transmitting mechanism from the body frame mechanism for driving said traction wheels, controlling members manipulated from the body frame for operatively connecting and disconnecting said truck wheels from the power transmitting elements.

46. In a harvester, a body frame, a supporting wheel at each side of said frame, a trailer truck, an auxiliary frame between said truck and said body frame, power transmitting mechanism on said body frame, said trailer truck including traction wheels, a supporting yoke therefor pivoted to turn on a vertical axis, steering mechanism controlled from the body frame and connected with said yoke for turning the same, power transmitting mechanism from the body frame mechanism for driving the truck wheels, controlling elements manipulated from the body frame for operatively connecting and disconnecting said truck wheels from the power elements.

47. In a harvester, a spokeless tractor wheel having an internal runway, a body frame on which the harvesting machinery is located, a supporting wheel for said frame running in said runway, a caster wheel for supporting the grain side of said frame, a third support for said frame which comprises a trailer truck and a frame joining said truck with said body frame, power transmitting elements for driving said trailer truck and including a propeller shaft extending from the body frame to the truck, driving elements on the body frame for operating said propeller shaft, means on the body frame connected with said truck for turning said truck on a vertical axis for steering purposes.

48. In a harvester, a spokeless tractor wheel having an internal runway, a body frame on which the harvesting machinery is located, a supporting wheel for said frame running in said runway, a caster wheel for supporting the grain side of said frame, a third support for said frame which comprises a trailer truck and a frame joining said truck with said body frame, power transmitting elements for driving said trailer truck and including a propeller shaft extending from the body frame to the truck, driving elements on the body frame for operating said propeller shaft, means on the body frame connected with said truck for turning said truck on a vertical axis for steering purposes, said truck comprising a yoke having bearings, a turn-table connection between said yoke and said frame that joins said truck with the body frame, a shaft carried by said yoke frame, traction wheels loose on said shaft, clutch devices for clutching said traction wheels to said shaft, means for operating said clutch devices, a drive gear with which said propeller shaft is geared, and power transmitting connection between said truck gear and said shaft to turn the same.

ADAM B. MEINHARDT.